(12) United States Patent
Lee et al.

(10) Patent No.: US 10,919,558 B2
(45) Date of Patent: Feb. 16, 2021

(54) STEERING APPARATUS FOR VEHICLE

(71) Applicant: MANDO CORPORATION, Gyeonggi-do (KR)

(72) Inventors: Suk Hee Lee, Seoul (KR); Woo Jin Shin, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 78 days.

(21) Appl. No.: 16/223,101

(22) Filed: Dec. 17, 2018

(65) Prior Publication Data

US 2019/0185042 A1 Jun. 20, 2019

(30) Foreign Application Priority Data

Dec. 19, 2017 (KR) .................. 10-2017-0174875
Dec. 19, 2017 (KR) .................. 10-2017-0174884
Mar. 19, 2018 (KR) .................. 10-2018-0031345
Mar. 22, 2018 (KR) .................. 10-2018-0033088

(51) Int. Cl.
*B62D 1/181* (2006.01)
*B62D 1/184* (2006.01)
*B62D 1/183* (2006.01)
*B62D 1/04* (2006.01)
*B62D 1/06* (2006.01)

(52) U.S. Cl.
CPC .............. *B62D 1/181* (2013.01); *B62D 1/04* (2013.01); *B62D 1/06* (2013.01); *B62D 1/183* (2013.01); *B62D 1/184* (2013.01)

(58) Field of Classification Search
CPC . B62D 1/181; B62D 1/06; B62D 1/04; B62D 1/183; B62D 1/184; B62D 1/12

USPC .......................................................... 74/493
See application file for complete search history.

(56) References Cited

U.S. PATENT DOCUMENTS

| 10,562,558 B1 * | 2/2020 | Spahn ...................... B62D 1/04 |
| 2003/0146040 A1 * | 8/2003 | Dybalski ................ B62D 1/181 |
| | | 180/446 |
| 2007/0221007 A1 * | 9/2007 | Ozaki .................... B62D 5/006 |
| | | 74/484 R |

(Continued)

FOREIGN PATENT DOCUMENTS

| DE | 10256679 A1 * | 6/2004 | ............... B62D 1/04 |
| DE | 102006006995 A1 * | 8/2007 | ............. B62D 1/181 |

(Continued)

OTHER PUBLICATIONS

Machine Translation of FR-3043048 (Year: 2018).*

(Continued)

*Primary Examiner* — James A English
*Assistant Examiner* — Kurtis Nielson
(74) *Attorney, Agent, or Firm* — Ladas & Parry, LLP

(57) ABSTRACT

A steering apparatus for a vehicle includes: a steering wheel comprising a shaft coupler connected to an upper steering shaft of a vehicle, and a first grip member and a second grip member disposed on the shaft coupler; a steering column having the upper steering shaft therein and connected with the shaft coupler to change the axial length thereof in accordance with driving modes; and a controller rotating at least one of the first grip member, the second grip member, and the shaft coupler, depending on the driving modes.

20 Claims, 32 Drawing Sheets

(56) References Cited

U.S. PATENT DOCUMENTS

| | | | | |
|---|---|---|---|---|
| 2009/0065285 | A1* | 3/2009 | Maeda | B60K 37/00 |
| | | | | 180/400 |
| 2013/0160597 | A1* | 6/2013 | Masuda | B62D 1/181 |
| | | | | 74/493 |
| 2014/0277896 | A1* | 9/2014 | Lathrop | B62D 1/06 |
| | | | | 701/23 |
| 2015/0224877 | A1* | 8/2015 | Bendewald | B60K 35/00 |
| | | | | 701/49 |
| 2017/0297606 | A1* | 10/2017 | Kim | B62D 1/181 |
| 2018/0079441 | A1* | 3/2018 | McKinzie | B62D 1/183 |
| 2018/0334183 | A1* | 11/2018 | Beauregard | B62D 1/06 |
| 2018/0370559 | A1* | 12/2018 | Swamidason | B62D 1/181 |
| 2019/0111963 | A1* | 4/2019 | Netzer | B62D 1/02 |
| 2019/0276065 | A1* | 9/2019 | Nagasawa | B62D 1/06 |

FOREIGN PATENT DOCUMENTS

| | | | |
|---|---|---|---|
| FR | 3043048 B1 * | 10/2018 | B62D 1/04 |
| JP | 1-111566 | 4/1989 | |
| JP | 2003-272487 | 9/2003 | |
| KR | 10-2007-0121127 | 12/2007 | |
| KR | 10-1836711 | 3/2018 | |

OTHER PUBLICATIONS

Machine Translation of DE-10256679 (Year: 2004).*
Machine Translation of DE-102006006995 (Year: 2007).*
Office Action dated May 2, 2019 for Korean Patent Application No. 10-2018-0031345 and its English machine translation by Google Translates.

* cited by examiner

SELF-DRIVING MODE

STEERING APPARATUS FOR VEHICLE

CROSS REFERENCE TO RELATED APPLICATIONS

This application claims priority to Korean Patent Application. No. 10-2017-0174884 filed on Dec. 19, 2017, Korean Patent Application No. 10-2017-0174875 filed on Dec. 19, 2017, Korean Patent Application No. 10-2018-0031345 filed on Mar. 19, 2018, and Korean Patent Application No. 10-2018-0033088 filed on Mar. 22, 2018, which are hereby incorporated by reference for all purposes as if fully set forth herein.

BACKGROUND

1. Technical Field

Various embodiments of the present disclosure relate to a steering apparatus for a vehicle. In more detail, some exemplary embodiments of the present disclosure relate to a steering apparatus for a vehicle enabling a driver to more widely use the space around the driver's seat by contracting or stretching a steering column into or out of a dashboard and/or contracting or stretching a grip member of the steering wheel into or out of the steering wheel depending on various driving modes, such as a driver-driving mode and a self-driving mode.

2. Description of Related Art

In general, an automotive steering apparatus includes a steering wheel through which operation is input from a driver. A steering shaft connected to the steering wheel is fixed to the car body of a vehicle. Further, a telescopic device or a tilting device, etc. may be installed for the convenience of a driver.

The telescopic device is a device allowing a steering column to axially stretch and contract, and a tilting device is a device for adjusting the angle of a steering column.

However, according to such automotive steering apparatuses, the steering wheel can only be moved for optimizing the drive in accordance with the body shapes of drivers.

In particular, recently, as self-driving vehicles are more actively studied and developed, there is a demand for a structure that can stretch and contract a steering column and a steering wheel which allows expanded use of the space around a driver's seat in a self-driving mode.

SUMMARY

Various embodiment of the present disclosure may provide a steering apparatus for a vehicle. According to some embodiments of the present disclosure, in the steering apparatus, in accordance with necessity of a driver, a steering column can protrude out of a dashboard and a steering wheel can be moved to a position where it can be operated by the driver or, the steering column can be inserted into the dashboard and the steering wheel can be moved close to the dashboard. According to certain embodiments of the present disclosure, grip members of a steering wheel can protrude out of the steering wheel in a driver-driving mode, so the driver can steer the vehicle with the grip members in hand. In addition, grip members can be stowed in the steering wheel in a self-driving mode, so the driver can more widely use the space around the driver's seat.

Further, the aspect of the present disclosure is not limited thereto, and other unmentioned aspects of the present disclosure may be clearly appreciated by those skilled in the art from the following descriptions.

According to some exemplary embodiments of the present disclosure, a steering apparatus for a vehicle may include: a steering wheel including a shaft coupler connected to an upper steering shaft, and first and second grip members disposed on the shaft coupler; a steering column having the upper steering shaft therein and connected with the shaft coupler to change an axial length thereof in accordance with driving modes; and a controller configured to rotate at least one of the first grip member, the second grip member, and the shaft coupler, depending on the driving modes.

According to certain exemplary embodiments of the present disclosure, in accordance with necessity of a driver, a steering column can protrude out of a dashboard and a steering wheel can be moved to a position where it can be operated by the driver, or the steering column can be inserted into the dashboard and the steering wheel can be moved close to the dashboard. Further, according to some exemplary embodiments of the present disclosure, grip members of a steering wheel can protrude out of the steering wheel in a driver-driving mode, so the driver can steer the vehicle with the grip members in hand. In addition, grip members can be stowed in the steering wheel in a self-driving mode, so the driver can more widely use the space around the driver's seat.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
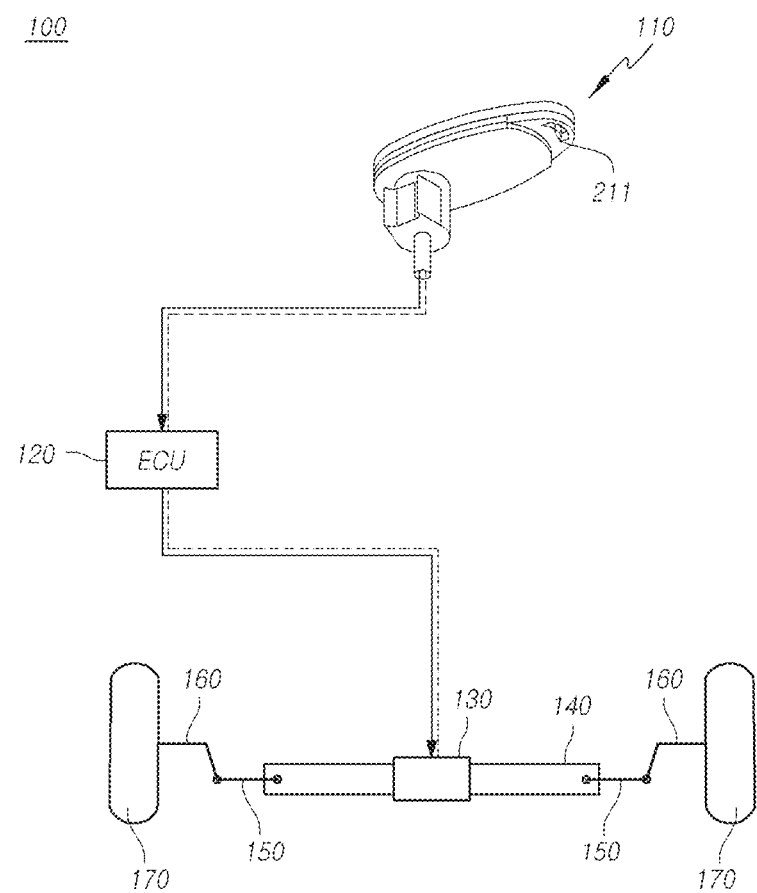
FIG. 1 is a view schematically showing a first structure of a steering apparatus for a vehicle according to embodiments of the present disclosure.

Hereinafter, aspects of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

A steering apparatus for a vehicle according to embodiments of the present disclosure may include a steering wheel 110, a steering column 330, and a controller 240.

The steering wheel 110 may include a shaft coupler 230, and a first grip member 210 and a second grip member 220. The shaft coupler 230 may be connected to an upper steering shaft 331. The first grip member 210 and the second grip member 220 may be disposed on or movably coupled to the shaft coupler 230.

The steering column 330 may have the upper steering shaft 331 and be connected with the shaft coupler 230 to change the axial length in accordance with various driving modes.

The controller 240 may be configured to rotate at least one of the first grip member 210, the second grip member 220, and the shaft coupler 230, depending on the driving modes.

First, referring to FIG. 1, the steering apparatus 100 for a vehicle according to embodiments of the present disclosure may include a steering wheel 110 having a structure in which two or more grip members (for example, 210 and 220 of FIGS. 3-5) can overlap or spread depending on driving modes; a rack bar 140; a tie rod 150 and knuckle arm 160 connected to the rack bar 140; and vehicle wheels 170 connected to the knuckle arm 160.

A motor 130 for steering control may be included in the rack bar 140.

The motor 130 can be controlled or driven by, for example, but not limited to, an Electronic Control Unit (ECU) 120. For example, the ECU 120 can drive the motor 130 by sensing a steering angle of the steering wheel 110 and transmitting a driving control signal according to the sensed steering angle to the motor 130.

The steering apparatus may be a mechanical automotive steering apparatus including a structure formed by the steering wheel 110 and a mechanical power transmission part such as an intermediate shaft between the steering column 330 and the rack bar 140 Alternatively, the steering apparatus 100 may be an automotive steer-by-wire steering apparatus without the mechanical power transmission part. Although the automotive steer-by-wire steering apparatus is exemplified in the following description for the convenience of description, the present disclosure is not limited thereto.

The automotive steer-by-wire steering apparatus may have a structure in which an ECU drives a motor included in a rack bar (first exemplary structure) or an ECU drives actuators coupled to wheels (second exemplary structure).

For example, a first exemplary structure of the automotive steer-by-wire steering apparatus 100 according to embodiments of the present disclosure is shown in FIG. 1. According to the first exemplary structure, the ECU 120 may sense steering information of the steering wheel 110 and transmit a control signal for driving the motor 130 connected with the rack bar 140 to the motor 130. The motor 130 may configured to provide rotate force in response to the control signal. The rack bar 140 may be moved linearly or straight by the rotation of the motor 130.

Figure 2:
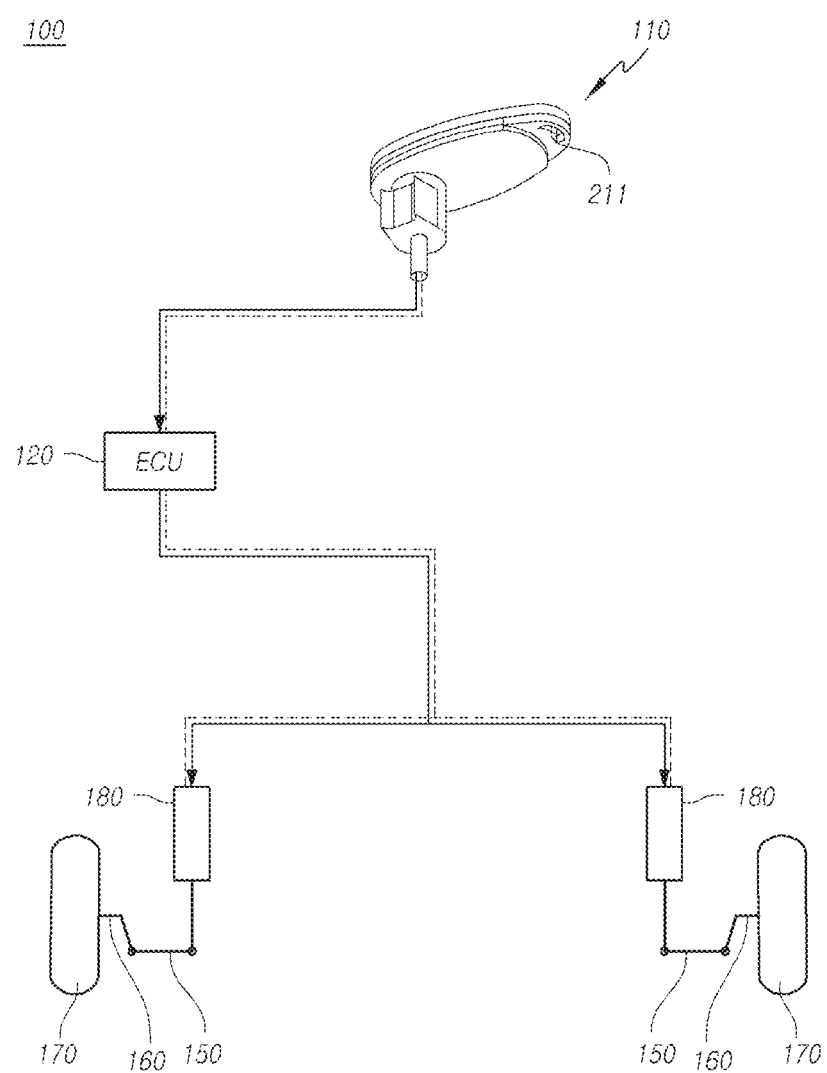
FIG. 2 is a view schematically showing a second structure of a steering apparatus for a vehicle according to embodiments of the present disclosure.

The vehicle wheels 170 are turned by the linear or straight motion of the rack bar 140. For instance, the second exemplary structure of the automotive steer-by-wire steering apparatus 100 according to embodiments of the present disclosure is shown in FIG. 2, and according to the second exemplary structure, the ECU 120 may configured to sense steering information of the convertible steering wheel 110 and to transmit at least one control signal for driving actuators 180 connected to the tie rods 150 and knuckle arms 160 to the actuators 180.

The automotive steer-by-wire steering apparatus 100 may include, for example, but not limited to, a reaction motor that generates torque in the opposite direction to a steering direction provided by a driver, a steering angle sensor, and a vehicle speed sensor, etc.

Figure 3:
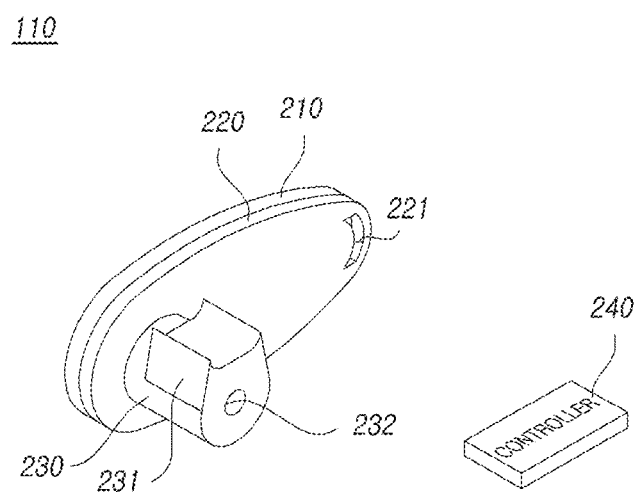
FIG. 3 is a view showing a steering wheel according to embodiments of the present disclosure.

Referring to FIG. 3, the steering wheel 110 included in the steering apparatus 100 may include: a first grip member 210, a second grip member 220, a shaft coupler 230 and a controller 240. The first grip member 210 may comprise a first connection hole 412 at a side and a first grip 211 at the opposite side. The second grip member 220 may have a second connection hole corresponding to the first connection hole 412 and a second grip 221 at the opposite side. The shaft coupler 230 may couple the first grip member 210 and the second grip member 220 to each other through the first connection hole 412 and the second connection hole. The controller 240 may be configured to rotate at least one of the first grip member 210, the second grip member 220, and the shaft coupler 230 in different directions so that the first grip member 210 and the second grip member 220 can spread out from the shaft coupler 230 or the first grip member 210 and the second grip member 220 close.

The first grip member 210 and the second grip member 220 may be, for example, but not limited to, elliptical 3D parts. However, the first grip member 210 and/or the second grip member 220 may have a common handle shape (e.g., circle), or may have various shapes such as a rectangular parallelepiped, a cylinder or any shape that the driver can grip.

The first connection hole 412 and the second connection hole may be the same in shape and size. However, the first connection hole 412 and the second connection hole may have a different shape and/or size from each other. Though not shown, the position of the second connection hole may be the same as that of the first connection hole 412.

The driver can steer the vehicle with the first grip 211 and the second grip 221 in hands. As shown in FIG. 2, the grips may have curved open holes, but are not limited thereto, and may have any shapes of structures that a driver can conveniently hold.

The shaft coupler 230 may be the same in shape as the first connection hole 412 and the second connection hole so that the first connection hole 412 and the second connection hole can be coupled to each other on a side. A motor seat 231 for mounting or fixing a motor may be formed on the other side of the shaft coupler 230.

The motor seat 231 may be formed at the portion that is not coupled to the first grip member 210 and the second grip member 220. The motor seat 231 may be ridged at both ends to prevent separation of the motor, but is not limited thereto. The motor seat 231 may be integrally formed with the shaft coupler 230 or may be a separate member.

The shaft coupler 230 may have a third connection hole 232 at a side to be connected with the steering column 330 of which length can be changed the length in accordance with driving modes. For example, a circular hole may be formed at the position where the motor seat 231 is formed. However, it is not limited thereto.

A protrusion may be formed on the inner surface or side of the third connection hole 232 of the shaft coupler 230 and a groove may be formed on a portion of the steering column to prevent idling between the steering wheel 110 and the steering column 330, but it is not limited thereto.

The controller 240 may correspond to the ECU 120 shown in FIG. 1. The controller 240 may be a controller disposed in a vehicle, as shown in FIG. 2. The controller may be an ECU, but it is not limited thereto. It is exemplified in the following description that the controller 240 is the ECU 120 shown in FIG. 1 for the convenience of description.

The controller 240 may be configured to rotate at least one of the first grip member 210, the second grip member 220, and the shaft coupler 230, and can provide a control signal such that the first grip member 210 and the second grip member 220 spread from the shaft coupler 230 or can provide another control signal such that the first grip member 210 and the second grip member 220 close.

The controller 240 may be configured to rotate at least one of the first grip member 210, the second grip member 220, and the shaft coupler 230, and can be configured to control the first grip member 210 and the second grip member 220 to spread from the shaft coupler 230 or can control the first grip member 210 and the second grip member 220 to close, depending on driving modes.

The driving modes may include at least one of a self-driving mode in which a vehicle is automatically driven or a driver-driving mode in which a driver manually drives a vehicle. A detailed method of operating the steering wheel 110 and the steering column 330 according to embodiments of the present disclosure is described hereafter.

Figure 4:
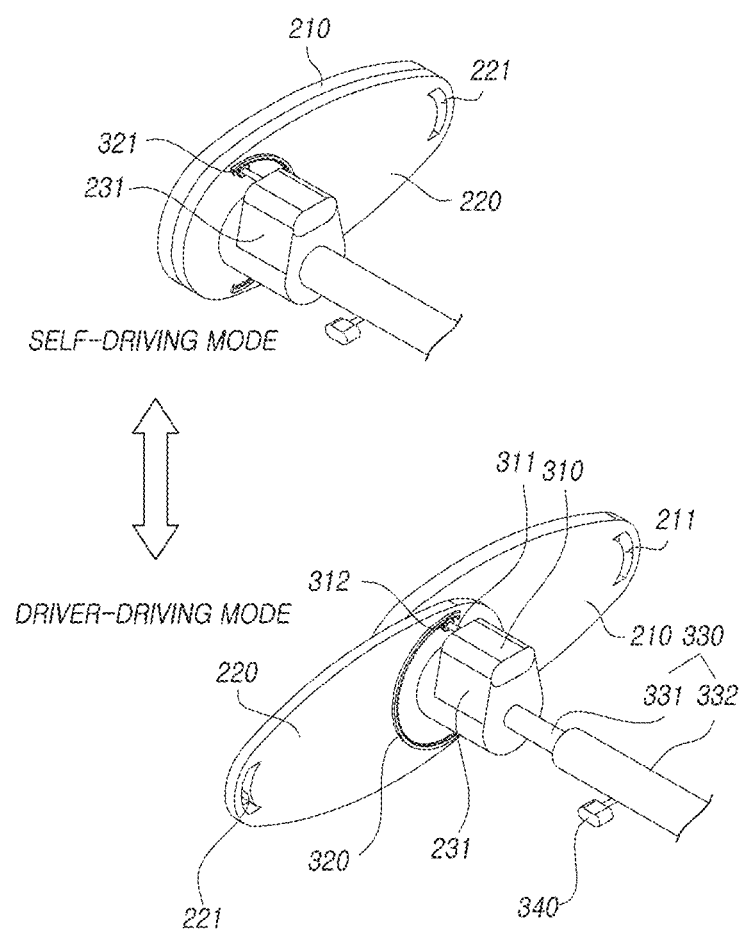
FIG. 4 is a view showing a steering column and a column driving motor of a steering apparatus for a vehicle according to embodiments of the present disclosure.
Figure 5:
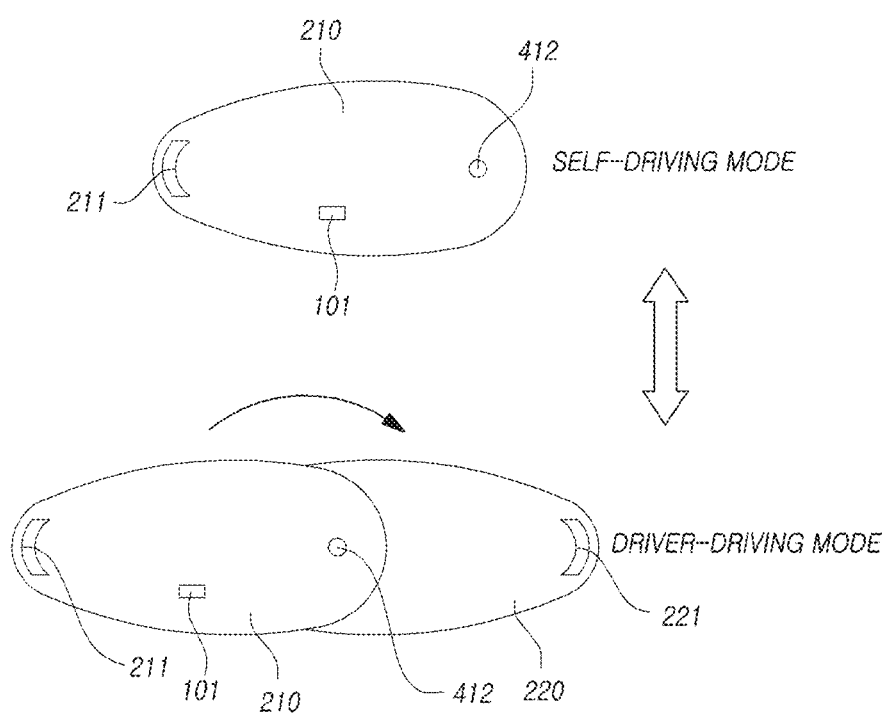
FIG. 5 is a front view showing rotation of a steering wheel according to embodiments of the present disclosure.

Referring to FIGS. 4 to 5, there are various methods of rotating at least one of the first grip member 210, the second grip member 220, and the shaft coupler 230. For example, the steering apparatus may further include a driving motor 310. The driving motor 310 may be configured to rotate at least one of the first grip member 210, the second grip member 220, and the shaft coupler 230 in response to one or more control signals output from the controller 240. For example, as shown in FIG. 4, the second grip member 220 can be moved in an arc shape by the driving motor 310 in a manner similar to a folding fan being unfolded.

In detail, the driving motor 310 may be disposed on the motor seat 231 and a first pinion gear 312 is disposed or fitted on a first rotary shaft 311 of the driving motor 310. The driving motor 310 may have, for example, but not limited to, a hexagonal prism shape, as shown in FIG. 4. A first rack gear 320 may be disposed on the second grip member 220 to be engaged with the first pinion gear 312. The first rack gear 320 may have a circular shape to surround a portion of the second connection hole. The first pinion gear 312 can be formed in any shape as long as it can be engaged with the first rack gear 320. Stoppers 321 may be configured to limit or stop movement of the second grip member 220 and may be formed at one or both ends of the first rack gear 320. When the driving motor 310 is driven by the controller 240, the first pinion gear 312 is rotated by the first rotary shaft 311 and the first rack gear 320 engaged with the first pinion gear 312 is also moved accordingly.

For example, when the driving mode is a self-driving mode, the controller 240 rotates at least one of the first grip member 210, the second grip member 220, and the shaft coupler 230 in a first rotational direction such that the first grip member 210 and the second grip member 220 close with the shaft coupler 230 therebetween. When the driving mode is a driver-driving mode, the controller 240 rotates at least one of the first grip member 210, the second grip member 220, and the shaft coupler 230 in a second rotational direction such that the first grip member 210 and the second grip member 220 spread.

For example, in the self-driving mode, as described above, the second grip member 220 is rotated counterclockwise, which is the first rotational direction, in the point of view of a driver seeing the steering wheel 110, by the movement of the first pinion gear 312 and the first rack gear 320, so the second grip member 220 overlaps the first grip member 210.

On the contrary, in the driver-driving mode, the second grip member 220 is rotated clockwise, which is the second rotational direction, in the point of view of a driver seeing the steering wheel 110, by the movement of the first pinion gear 312 and the first rack gear 320, so the first grip member 210 and the second grip member 220 spread.

The steering apparatus 100 for a vehicle according to embodiments of the present disclosure, as shown in FIG. 3, may include the steering column 330 and a column driving motor 340. The steering column 330 may be connected with the shaft coupler 230 and the length of the steering column 330 is changeable. The column driving motor 340 may be configured to change the length of the steering column 330 in accordance with the driving modes.

When the steering column 330 is coupled to the shaft coupler 230, the length of the steering column 330 when the driving mode is the self-driving mode may be smaller than the length of the steering column 330 when the driving mode is the driver-driving mode.

The steering column 330 may include an outer column 332 and an upper steering shaft 331 inserted in she outer column 332. The outer column 332 may be fixed by being combined with a coupling bracket (not show) formed at the car body of the vehicle.

The upper steering shaft 331 can be axially movable to protrude toward the driver or to be contracted to be inserted into a dashboard by the column driving motor 340. The operation of the steering column 330 will be described in detail with reference to FIG. 6.

The column driving motor 340 is disposed or inserted in the outer column 332 to be engaged with the upper steering shaft 331. The column driving motor 340 is driven in response to a control signal output from the controller 240. The operation of the column driving motor 340 will be described in detail with reference to FIG. 6.

According to the above description, since the steering wheel 110 that is convertible in accordance with driving modes is provided, it is possible to provide a wider and more efficient space for the passenger in the driver's seat or it is possible to enable a driver to conveniently manually steer the vehicle.

Figure 6:
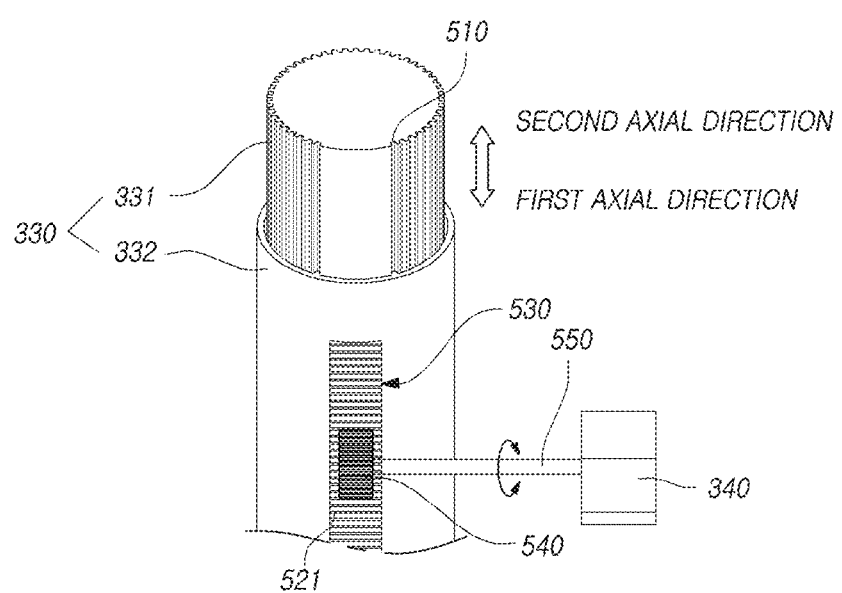
FIG. 6 is a view schematically showing the steering column and the column driving motor.

FIG. 6 is a view schematically showing the steering column 330 and the column driving motor 340.

Referring to FIG. 6, the steering column 330 may include the upper steering shaft 331, the outer column 332, etc. First grooves 510 may be formed on the outer side of the upper steering shaft 331 and protrusions (not shown) may be formed on the inner side of the outer column 332 to prevent idling of the upper steering shaft 331 and the outer column 332.

A second rack gear 521 may be axially disposed on a portion of the outer side of the upper steering shaft 331. The length of the upper steering shaft 331 in a axial direction is larger than the outer column 332 to be coupled to a third connection hole 232 formed at the shaft coupler 230. The second rack gear 521 of the upper steering shaft 331 may be engaged with a second pinion gear 540 of the column driving motor 340.

The outer column 332 may be, for example, but not limited to, a hollow cylinder to receive at least a portion of the upper steering shaft 331. A gear coupling hole 530 is axially formed at a side of the outer column 332 to expose the second rack gear 521 of the upper steering shaft 331.

For example, the gear coupling hole 530 may be formed to correspond to the position of the second rack gear 521 and may be open to be engaged with the second pinion gear 540 of the column driving motor 340. The driving motor 530 may be formed in a rectangular shape, as shown in FIG. 5, but is not limited thereto.

The column driving motor 340 may include the second pinion gear 540 engaged with the second rack gear 521 of the upper steering shaft 331, and a second rotary shaft 550 including the second pinion gear 540. The second pinion gear 540 and the second rack gear 521 can be formed in any shape as long as they can be engaged with each other.

The second pinion gear 540 is rotated by the column driving motor 340. The second rack gear 521 is moved linearly or straight axially, for example, upward (second axial direction) or downward (first axial direction) in FIG. 5 by the rotation of the second pinion gear 540.

Accordingly, the upper steering shaft 331 inserted in the outer column 332 may make a telescopic motion to partially further protrude or contract to the initial position.

For example, the controller 240 can be configured to rotate at least one of the first grip member 210, the second grip member 220, and the shaft coupler 230 and can drive the column driving motor 340. In accordance with the same principles described above, the controller 240 can control the first grip member 210 and the second grip member 220 to spread or close with the shaft coupling member 230 therebetween by changing the rotational direction.

The column driving motor 340 can be configured to protrude the steering column 330 axially (second axial direction) such that the first grip member 210 and the second grip member 220 spread to come close to a driver or to contract the steering column 330 axially (first axial direction) such that the first grip member 210 and the second grip member 220 move away from the driver and overlap each other.

For example, as described above, the second grip member 220 is rotated to overlap or spread away from the first grip member 210 by rotation of the driving motor 310. When the first grip member 210 and the second grip member 220 spread, the upper steering shaft 331 can be axially moved by rotation of the column driving motor 340 such that the steering wheel 110 protrudes toward a driver. When the first grip member 210 and the second grip member 220 overlap each other, the upper steering shaft 331 can be moved axially (e.g. first axial direction) into the outer column 332 by rotation of the column driving motor 340.

When the driving mode is the self-driving mode, the steering column 330 can be contracted in the first axial direction such that the first grip member 210 and the second grip member 220 close away from the driver with the shaft coupler 230 therebetween. When the driving mode is the driver-driving mode, the steering column 330 can protrude in the second axial direction such that the first grip member 210 and the second grip member 220 spread to come close to the driver with the shaft coupling member 230 therebetween.

The steering apparatus 100 for a vehicle according to embodiments of the present disclosure may be a steer-by-wire steering apparatus for a vehicle in which, without a mechanical power transmission part between the steering wheel 110 and the rack bar 140, the ECU 120 senses steering information of the steering wheel 110 and transmits a control signal for driving the motor 130 connected to the rack bar 140 or the actuators 180 connected to the tie rods 150 and the knuckle arms 160 to the motor 130 or the actuators 180 so that the vehicle wheels 170 are turned by the motor 130 or the actuators 180.

According to the above description, since the automotive steering apparatus 100 including the steering wheel 110 that is convertible in accordance with driving modes is provided, it is possible to provide a wider and more efficient space for the passenger in the driver's seat or it is possible to enable a driver to conveniently manually steer the vehicle.

Figure 7:
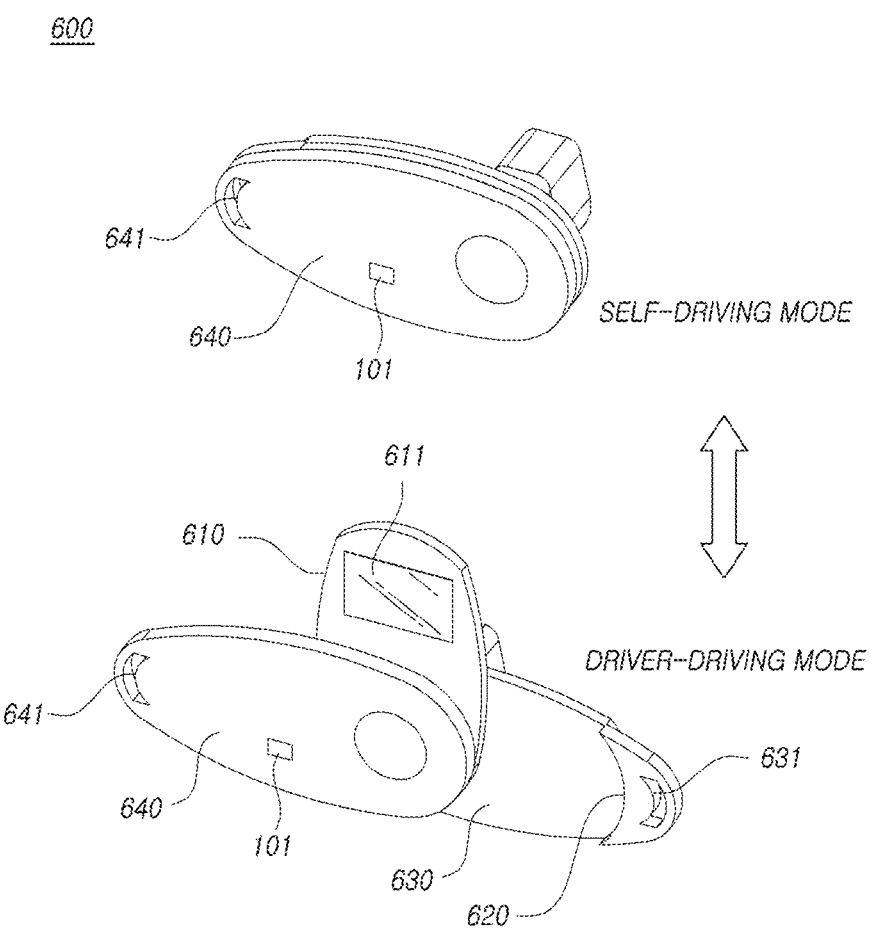
FIG. 7 is a perspective view showing rotation of the steering wheel.
Figure 8:
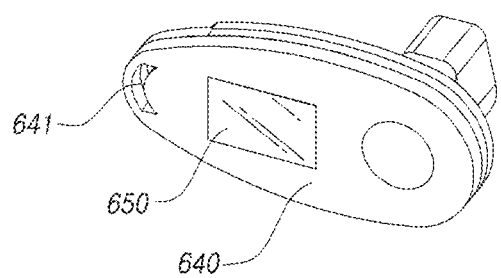
FIG. 8 is a view showing arrangement of a liquid crystal display panel included in the steering wheel.
Figure 9:
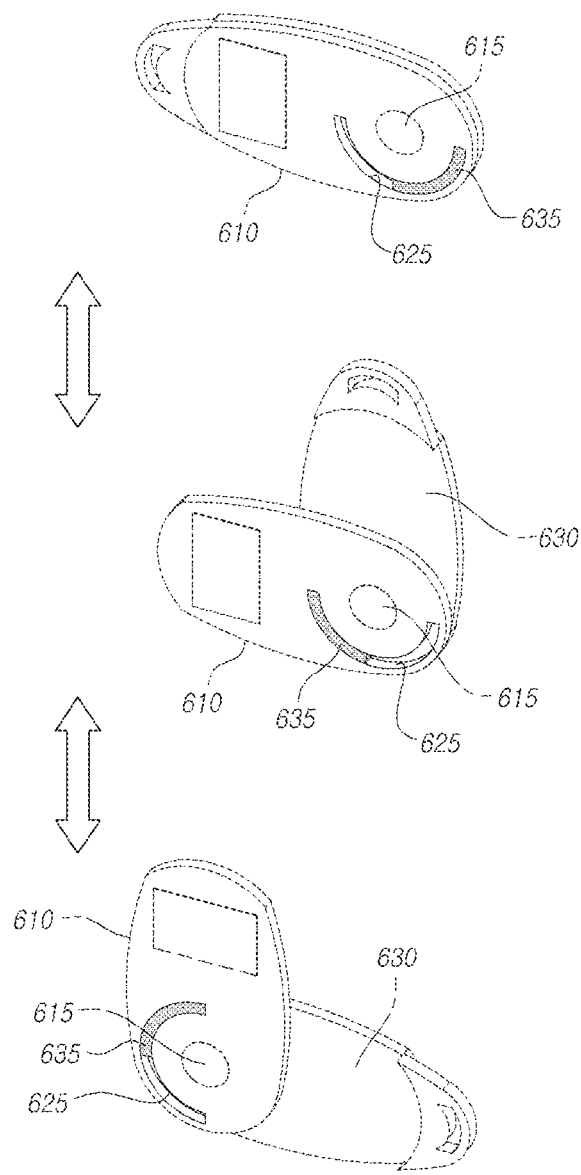
FIG. 9 is a view schematically showing a coupling relationship between a display device and a second grip member.

FIG. 7 is a perspective view showing rotation of a steering wheel 600 according to another embodiment, FIG. 8 is a view showing arrangement of a liquid crystal display panel included in the steering wheel 600 according to another embodiment, and FIG. 9 is a view schematically showing the coupling relationship between a display device 610 and a second grip member 630.

Referring to FIGS. 7 to 9, the steering wheel 600 according to another embodiment may further include a display device 610 in addition to the steering wheel 110 according to embodiments of the present disclosure shown in FIGS. 3 to 5.

The display device 610 may have a fourth connection hole 615, which is the same as the first connection hole 412 and the second connection hole, at an end, a display panel 611 at the other end, and an insertion hole 625 surrounding the fourth connection hole 615.

The display panel 611 can display or provide, for example, but not limited to, driving information such as the situations of surrounding roads and the state of the subject vehicle to the driver. The display panel 611 may be a liquid crystal display (LCD) panel or an organic light emitting display (OLED) panel. The display panel 611 may be formed in a rectangular shape, as shown in FIG. 6, but is not limited thereto.

A step 620 may be formed close to the second grip 631 to fit the display device 610 to the second grip member 630.

The step 620 may have a 3D shape that is the same as the shape of the edge close to the display panel 611. The step 620 may be formed by protruding a port on of the second grip member 630 including the second grip 631 toward the driver.

The display device 610, as shown in FIG. 7, may be separately provided. That is, when the steering wheel 600 according to another embodiment is unfolded in the driver-driving mode, the display device 610 may be positioned at the center separately from the first grip member 640 and the second grip member 630.

Other than this structure, a display panel 650 may be disposed on a surface of the first grip member 640, as shown in FIG. 8. Accordingly, when the steering wheel 600 according to another embodiment is folded in the self-driving mode, a driver can obtain image information from the display panel 650 included in the first grip member 640.

The display device 610 can be rotated by the controller 240. The rotation may be achieved in various methods, but an example is described with reference to FIG. 9. The following description referring to FIG. 9 is based on the direction in which the driver sees the steering wheel 110 with reference to the arrangement of the second grip member 630 and the display device 610.

Referring to FIG. 9, a coupling protrusion 635 formed at the second grip member 630 is inserted or fitted in the insertion groove 625 formed at the display device 610.

The insertion groove 625, as shown in FIG. 9, may be an arc groove or hole in which the coupling protrusion 635 may be moved, but is not limited thereto. The insertion groove 625 is positioned coaxially with the fourth connection hole 615 to surround the fourth connection hole 615 with a predetermined gap therebetween.

The coupling protrusion 635, as shown in FIG. 9, may be formed in a shape corresponding to the structure of the insertion groove 625 to be fitted in the insertion groove 625. The coupling protrusion 635 can be moved in the insertion groove 625.

When the display device 610 and the second grip member 630 are coupled to the shaft coupler 230 as shown in FIGS. 3 and 4, the insertion groove 625 disposed under the fourth connection hole 615 of the display device 610 and the coupling protrusion 635 disposed under the second connection hole of the second grip member 630 are also fitted to each other.

For example, the coupling protrusion 635 may be positioned at a side, for example, the right side of the insertion groove 625 when the second grip member 630 and the display device 610 overlap each other. As described above, when the second grip member 630 is moved, for example, rotated clockwise, by the driving motor 310 as shown in FIG. 4, the coupling protrusions 635 is also rotated clockwise in the insertion groove 625. When the second grip member 630 is moved and the long axis of the second grip member 630 is perpendicular to the ground, the coupling protrusion may be positioned at the other side, for example, the left side of the insertion groove 625.

When the second grip member 630 is further moved, the display device 610 is also moved, for example, rotated clockwise due to fitting of the coupling protrusion 635 and the insertion groove 625.

When the second grip member 630 finishes being moved, the insertion groove 625 is positioned at the left side of the fourth connection hole 615 and the coupling protrusion 635 is positioned at the upper left side of the insertion groove 625. The display device 610 is positioned at the center, for example, with the long axis perpendicular to the ground.

For example, the second grip member 630 is moved in the principle described above with reference to FIGS. 3 and 4, the coupling protrusion 635 is moved in the insertion groove 625 and the display device 610 is also sequentially moved. When the second grip member 630 is stopped by the stopper 321, the display device 610 can be positioned at the center between the first grip member 640 and the second grip member 630. For example, the long axis of the display device 610 is positioned perpendicular to the ground, the first grip member 640 is positioned at 90 degrees at the left side from the display device 610, and the second grip member 630 is positioned at 90 degrees at the right side from the display device 610 in a substantially inverse T-shape. However, the present disclosure is not limited thereto.

As described above, according to embodiments of the present disclosure, it is possible to enable a driver to conveniently and easily obtain the driving information of a vehicle.

Figure 10:
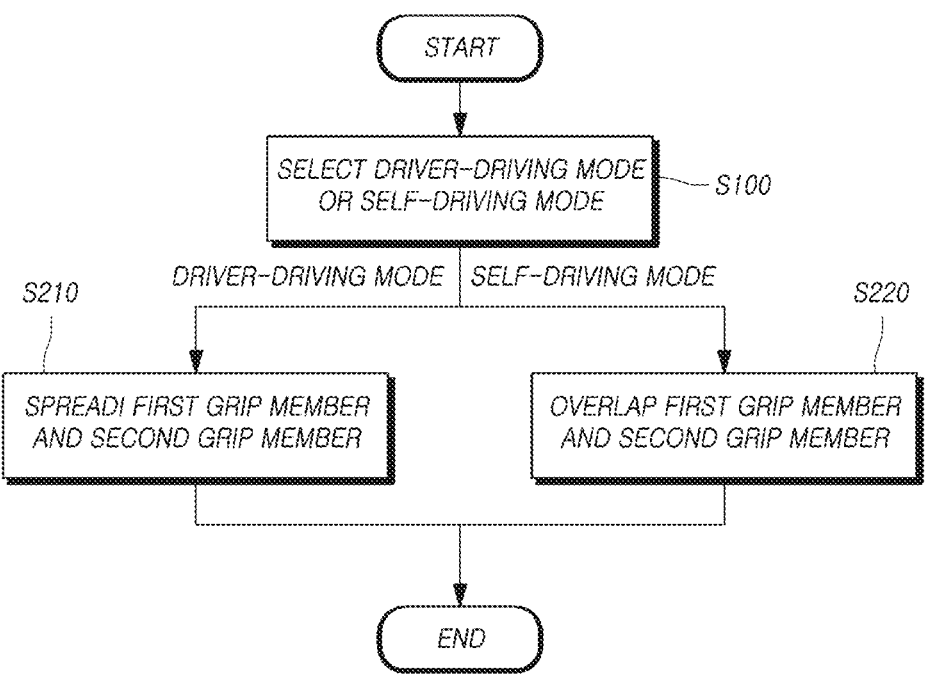
FIGS. 10 and 11 are flowcharts showing a method of operating a steering apparatus for a vehicle.
Figure 11:
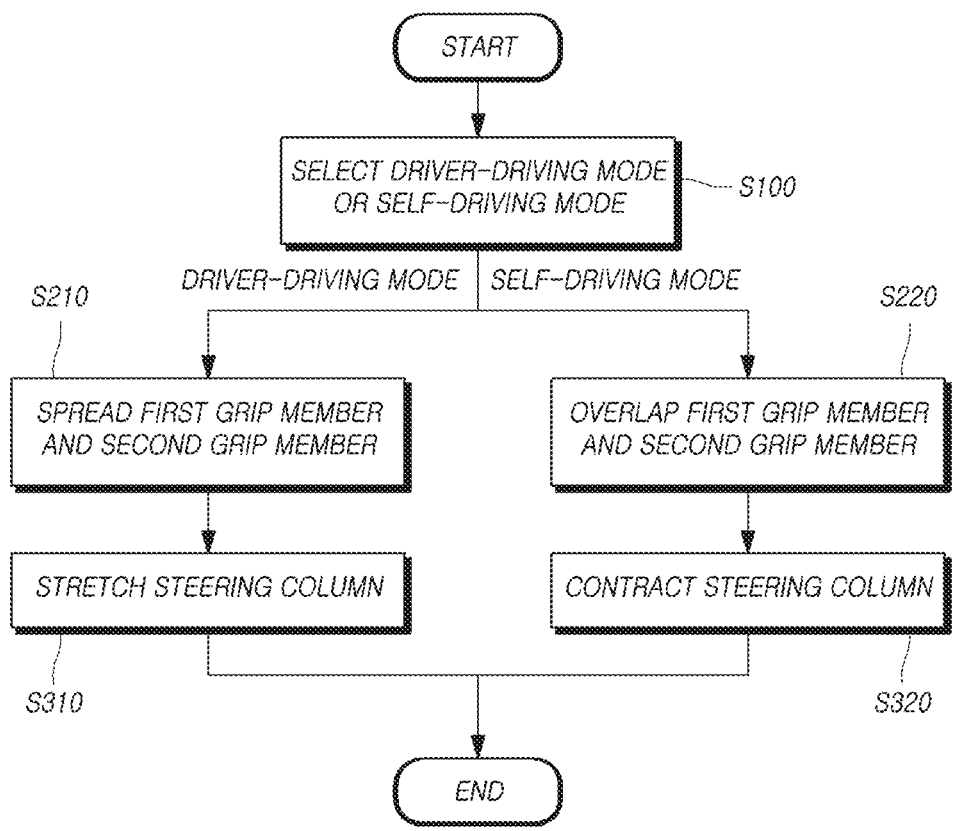
Figure 12:
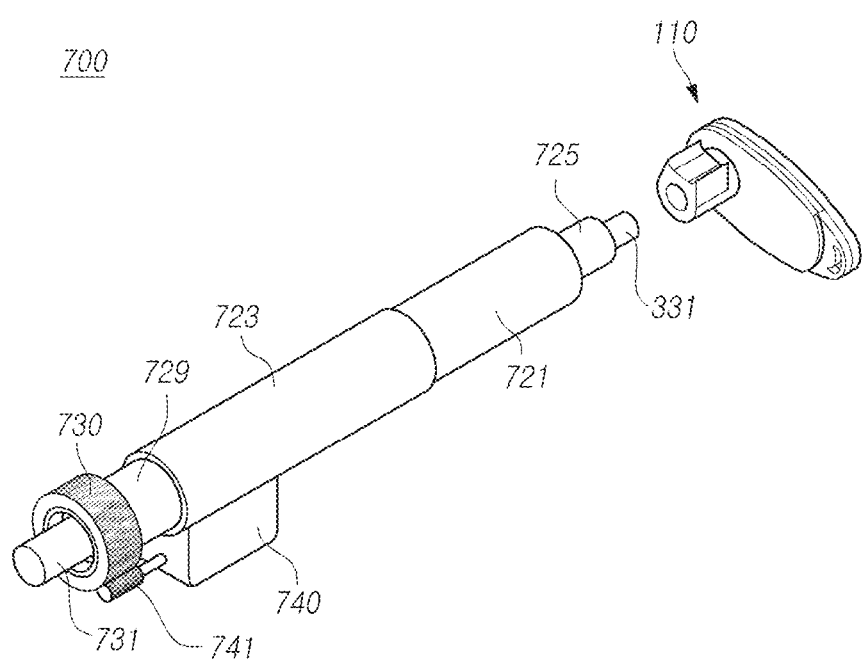
FIGS. 12 and 13 are perspective views showing a portion of a steering column according to embodiments of the present disclosure.
Figure 13:
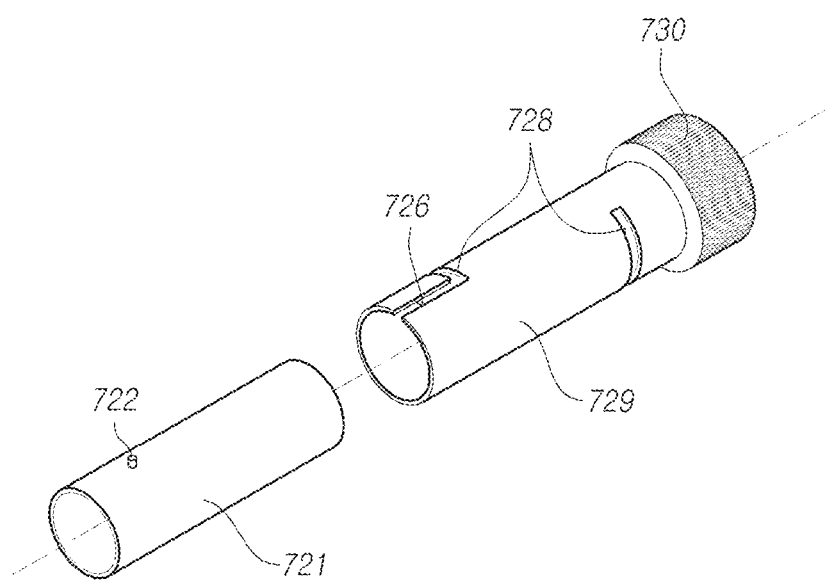
Figure 14:
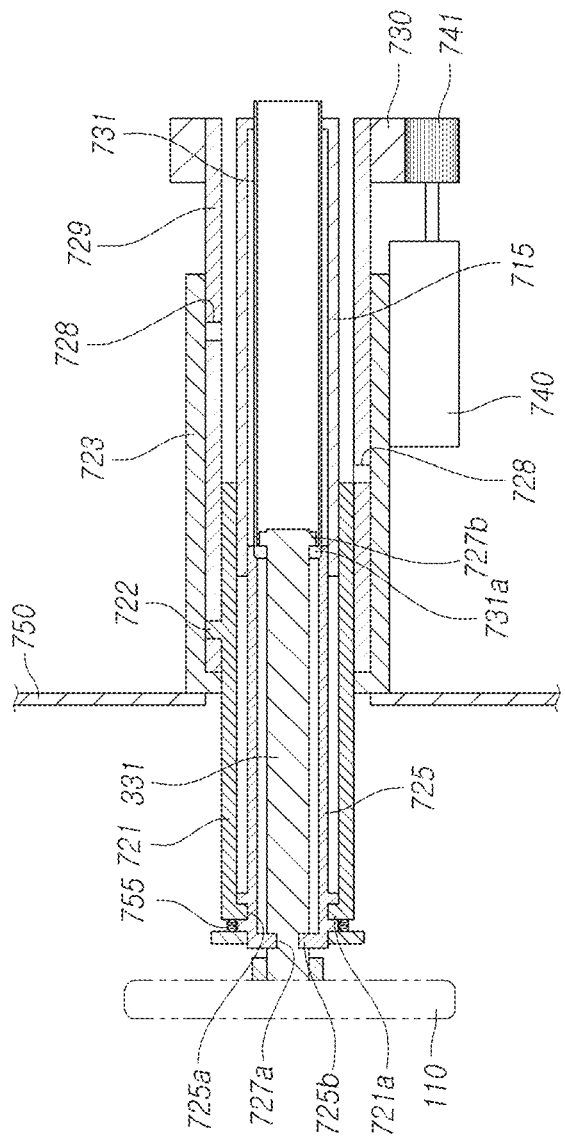
FIGS. 14 and 15 are cross-sectional views showing examples of stretching and contracting a steering column according to embodiments of the present disclosure.
Figure 15:
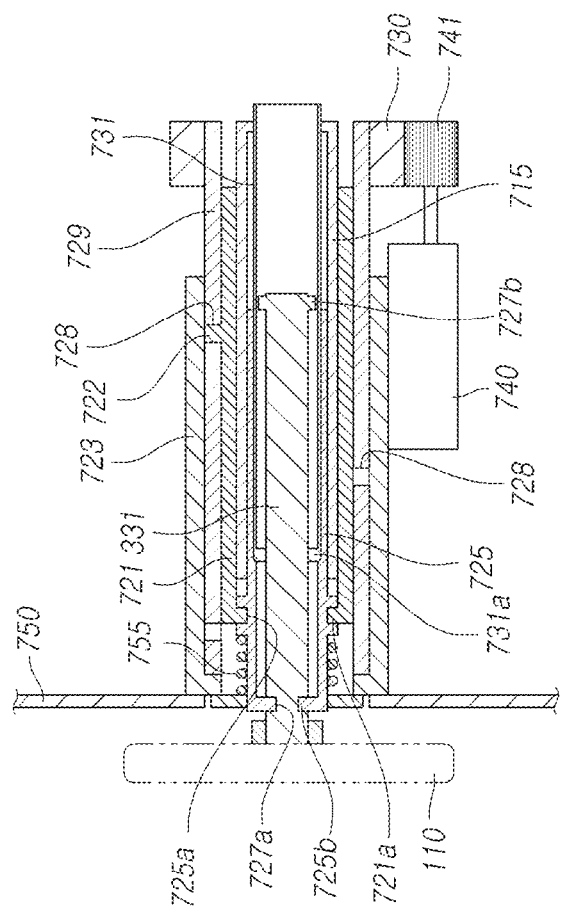

FIG. 10 is a flowchart showing a method of operating a steering apparatus for a vehicle according to an embodiment of the present disclosure, and FIG. 11 is a flowchart showing a method of operating a steering apparatus for a vehicle according to another embodiment of the present disclosure.

Referring to FIG. 10, the method of operating the steering apparatus for the vehicle according to embodiments of the present disclosure may include: selecting a driver-driving mode or a self-driving mode (S100); spreading a first grip member and a second grip member with a shaft coupler therebetween by rotating at least one of the first grip member, the second grip member, and the shaft coupler in a first rotational direction when the driver-driving mode is selected (S210); and closing the first grip member and the second grip member with the shaft coupler therebetween by rotating at least one of the first grip member, the second grip member, and the shaft coupler in a second direction when the self-driving mode is selected (S220).

The driver can select one of driving modes such as the driver-driving mode and the self-driving mode by pressing physical buttons or touching electronic buttons provided in a vehicle, but not limited thereto.

The operation of spreading or closing the first grip member and the second grip member, depending on the driving modes, can be achieved in the principle described above with reference to FIGS. 3 and 4.

As shown in FIG. 11, a process of stretching a steering column when the driver-driving mode is selected (S310) and a process of contracting the steering column when the self-driving mode is selected (S320) may be further performed.

The operation of stretching or contracting a steering column can be achieved in the principle described above with reference to FIGS. 3 to 6.

The orders of the steps shown in FIGS. 10 and 11 are only examples for the convenience of description, so the orders of the steps may be changed and additional steps may be further included between the steps. Alternatively, two or more steps may be it integrated and one step may be divided into two or more steps.

Referring to FIGS. 12 to 16, a steering column 700 according to embodiments of the present disclosure has a structure that is axially stowed while axially contracting or stretching.

For example, the steering column 700 according to embodiments of the present disclosure axially contracts into a cover housing 723 from the steering wheel 110 with respect to a cover housing 723 fixed to a car body (not shown) of a vehicle, so that the steering wheel 110 can come close to a dashboard 750 of the vehicle or axially protrudes.

According to embodiments of the present disclosure, the upper steering shaft 331 axially slides into or out of a lower steering shaft 731 and an inner cover housing 723 combined with the upper steering shaft 331 slides into or out of an outer cover shaft 715.

The inner housing 721 coupled or combined with an inner cover shaft 725 axially slides into or out of a control housing 729.

Since an end of the inner cover shaft 725 is coupled to an end of the upper steering shaft 331, when the inner cover shaft 725 is axially inserted or taken out, it moves the upper steering shaft 331 into or out of the lower steering shaft 731.

Since the inner housing 721 is coupled to an end of the inner cover shaft 725 and has a guide protrusion 722 on the outer side and the control housing 729 has a spiral guide hole 728 axially formed to receive the guide protrusion 722 of the inner housing 721, when the control housing 729 is rotated, the inner housing 721 axially slides.

The cover housing 723 fixed to the car body of a vehicle supports rotation of the control housing 729 rotatably inserted therein and a driving motor 740 that rotates the control housing 729 is coupled to the other end of the cover housing 723.

A first gear 730 is formed at the other end of the control housing 729 and a second gear 741 rotating the first gear 730 of the control housing 729 is disposed on the shaft of the driving motor 740, so that when the control housing 729 is rotated in a first direction or a second direction, depending on the operation direction of the driving motor 740, the inner housing 721, the inner cover shaft 725, and the upper steering shaft 331 correspondingly slide inside or outside.

For example, the first gear 730 of the control housing 729 may be a worm wheel and the second gear 741 of the driving motor 740 may be a worm.

Further, a connection hole 726 axially connected with the guide hole 728 may be further formed at an end of the control housing 729, so that the connection hole 726 enables the guide protrusion 722 to be easily inserted into the guide hole 728 when the inner housing 721 and the control housing 729 are coupled or combined.

A fixing protrusion 725b protruding radially inward is formed at an end of the inner cover shaft 725 and a fixing groove 727a in which the fixing protrusion 725b of the inner cover shaft 725 is inserted is formed at an end of the upper steering shaft 331.

An end of the upper steering shaft 331 is coupled to the steering wheel 110, so that the inner cover shaft 725, the upper steering shaft 331, and the steering wheel 110 can axially slide inward or outward together.

However, although the fixing protrusion 725b is formed at the inner cover shaft 725 and the fixing groove 727a is formed at the upper steering shaft 331 in the drawings, the present disclosure is not limited to this structure. For example, the fixing protrusion 725b may be formed at the upper steering shaft 331 and the fixing groove 727a may be formed at the inner cover shaft 725.

A locking protrusion 721a protruding radially inward is formed at an end of the inner housing 721 and a locking groove 725a to which the locking protrusion 721a of the inner housing 721 is coupled is formed at end of the inner cover shaft 725, so that the inner housing 721 and the inner cover shaft 725 can slide together.

However, although the locking groove 725a is formed at the inner cover shaft 725 and the locking protrusion 721a is formed at the inner housing 721 in the drawings, the present disclosure is not limited thereto. For instance, the locking protrusion 721a may be formed at the inner cover shaft 725 and the locking groove 725a may be formed at the inner housing 721.

The steering column 700 may further include an outer cover shaft 715 having an end in which the inner cover shaft 775 is coupled and the other end on which the inner housing 721 is coupled such that the inner cover shaft 725 and the inner housing 721 can axially slide.

The outer cover shaft 715 has an end supported by the inner cover shaft 725 and the inner housing 721 and the other end supported by the lower steering shaft 731 to support axial sliding of the inner cover shaft 725.

The steering column 700 may further include a lower steering shaft 731 inserted in the outer cover shaft 715 and having an end inserted in the upper steering shaft 331 and the other end supported by the outer cover shaft 715 such that the upper steering shaft 331 can axially slide.

An upper stopper 731a is formed at an end of the lower steering shaft 731 and a lower stopper 727b supporting the upper stopper 731a is formed at the other end of the upper steering shaft 331, so when the upper steering shaft 331 sides, the separation of the upper steering shaft 331 from the lower steering shaft 731 can be prevented and the sliding movement or distance can be limited.

A cover pad 717 is disposed on the outer side of the inner cover shaft 725 and ends of the cover pad 717 and the inner housing 721 are connected through an elastic member 755, so that when the inner housing 721 slides into the control housing 729, the cover pad 717 can be supported by an end of the cover housing 723.

For instance, when the upper steering shaft 331 and the inner cover shaft 725 are taken out, the extraction is finished with the lower stopper 727b supported by the upper stopper 731a. Further, when the upper steering shaft 331 and the inner cover shaft 725 are inserted, the insertion is finished with the cover pad 717 supported by an end of the cover housing 723.

The cover pad 717 may limit the sliding movement or distance when the steering column 700 contracts, and is brought in close contact with the inner housing 721 by the elasticity of the elastic member 755 when the steering column 700 has fully contracted, so it is possible to prevent from entering foreign substances into the cover housing 723.

Figure 16:
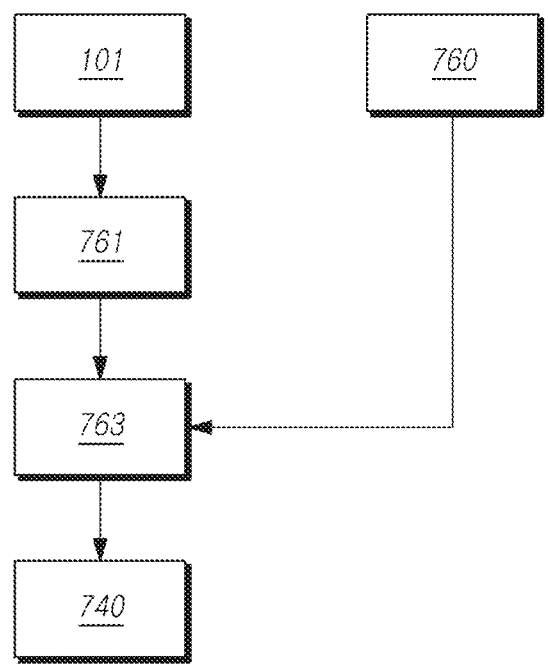
FIG. 16 is a diagram schematically showing the configuration of a steering column according to embodiments of the present disclosure.
Figure 17:
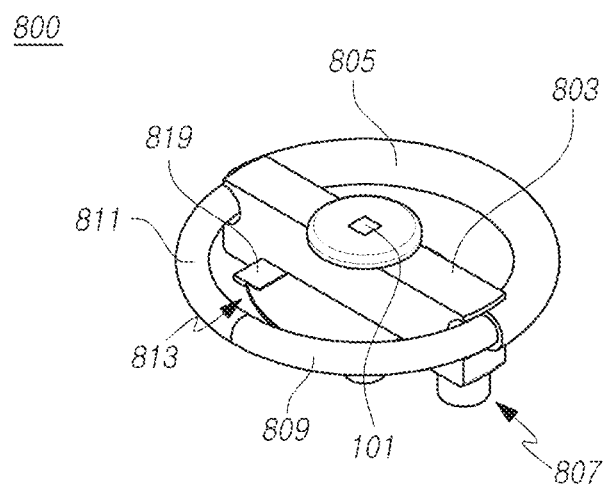
FIGS. 17 and 18 are perspective views showing a steering wheel of a vehicle according to embodiments of the present disclosure from above and from under.
Figure 18:
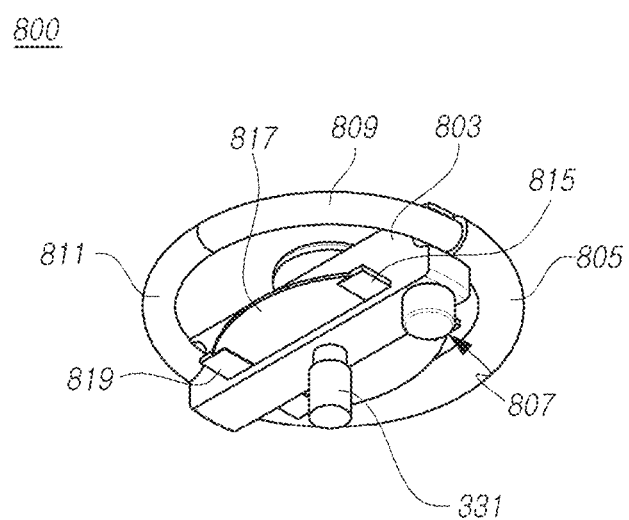

Referring to FIG. 16, the steering column 700 according to embodiments of the present disclosure may further include: an operation switch 101 disposed on the steering wheel 110 coupled to or combined with the upper steering shaft 331 to be operated in a pressing direction; a sensor 761 configured to sense at least one of the number of times of pressing, operation intensity, and operation time of the operation switch 101; and a controller 763 configured to control or operate the driving motor 740 in a forward direction or a backward direction, depending on the number of times of pressing input from the sensor 761, and control or operate the driving motor 740 for operation time input from the sensor 761 when an operation intensity value is larger than a predetermined operation value by comparing the operation intensity value input from the sensor 761 and the predetermined operation value with each other.

The operation switch 101 is operated in a pressing direction, so, for example, the steering column 700 can be contracted when the operation switch 101 is operated once in the pressing direction and can be stretched when the operation switch 101 is operated twice in the pressing direction.

The operation value set in advance in the controller 763 is provided to prevent a mistake of the driver, and when the operation switch 101 is pressed unintentionally to contract or stretch the steering column 700, the driving motor 740 is not operated.

For instance, an operation intensity value sensed by intended operation by a driver is set as the operation value in the controller 763 such that when the operation switch 101 is operated with intensity smaller than an operation intensity value sensed by intended operation by a driver, the driving motor 740 is not operated and the steering column 700 is not contracted and stretched. Accordingly, when an operation intensity value smaller than the operation value is input, it is determined as mis-operation and the driving motor 740 is not operated.

The operation switch 101 may be disposed on the steering wheel 110 for the operational convenience for the driver, but is not limited thereto and may be disposed on the door trim at the driver's seat of a vehicle, so detailed description is not provided.

The sensor 761 senses and transmits the number of times of pressing of the operation switch 101 to the controller 763 and the controller 763 determines the rotational direction of the driving motor 740 by finding out the driver's intention to contract or stretch the steering column 700 from the input number of times of pressing.

Further, the sensor 761 senses and transmits the operation intensity and operation time of the operation switch 101 pressed by the driver to the controller 763 and the controller 763 operates the driving motor 140 on the basis of the input operation intensity and operation time.

Accordingly, in this case, the driving motor 740 is operated in accordance with the operation time of the operation switch 101 pressed by the driver and the contracting or stretching distance of the steering column 700 is also increased in proportion to the operation time by the driver.

When the operation intensity value input from the sensor 161 is the same as or larger than a predetermined maximum operation value, the controller 163 operates the driving motor 740 such that the guide protrusion 722 of the inner housing 721 is moved to an end or the other end of the guide hole 128 of the control housing 729, whereby the steering column 700 is maximally stretched or contracted.

The maximum operation value set in the controller 763 means an operation intensity value sensed by intended operation by the driver in which the driver presses the operation switch 101 stronger than a normal state to maximally stretch or contract the steering column 700 and the operation intensity value is set as the maximum operation value. Accordingly, when the operation intensity value by the driver is the same as or larger than the predetermined maximum operation value, the driving motor 740 is operated to maximally stretch or contract the steering column 700.

When the operation intensity value input from a sensor is smaller than the predetermined maximum operation value, the controller 763, as described above, operates the driving motor 740 in accordance with the operation intensity and operation time by the driver pressing the operation switch 101.

Accordingly, in this case, the driving motor 740 is operated in accordance with the operation time of the operation switch 101 pressed by the driver and the contracting or stretching distance of the steering column 700 is also increased in proportion to the operation time by the driver.

The steering column 700 according to embodiments of the present disclosure may further include an ignition switch 760 that transmits an ignition-on or ignition-off state of an engine to the controller 763.

In this case, when a signal input from the ignition switch 760 changes from On to Off or from Off to On, the controller 763 operates the driving motor 740 such that the guide protrusion 722 is moved to an end or the other end of the guide hole 728, whereby the steering column 700 is maximally contracted or stretched.

That is, when the signal input from the ignition switch 160 changes from On to Off or from Off to On, it means that the driver stops driving the vehicle and has no intention to drive any more or the driver has intention to start driving the vehicle, so the driving motor 740 is operated such that the steering column 700 is maximally contracted or stretched.

When the signal input from the ignition switch 760 maintains the On-state, the controller 763 maintains the driving motor 740 in a stop state even if a pressing signal is input from the sensor 761.

That is, when the driver maintains the ignition switch 760 in the On-state, it means that the vehicle is being driven, so if the steering column 700 is contracted or stretched when the vehicle is being driven, a safety accident may occur.

Accordingly, when the signal input from the ignition switch 760 maintains the On-state, the controller 763 does not operate the driving motor 740 such that the steering column 700 is not contracted or stretched even if the driver operates the operation switch 101.

Further, it is possible to achieve a specific operation state of the steering column 700 according to embodiments of the present disclosure when a vehicle is in a self-driving mode.

For example, for a self-driving mode of a vehicle, a specific self-driving mode switch may be installed such that when the driver turns on the self-driving mode switch even if the signal input from the ignition switch 760 is in On-state, the steering column 700 is contracted into the dashboard in order for the driver to be able to more widely use the space around the driver's seat.

Referring to FIGS. 17 to 22, a steering wheel 800 according to embodiment may include: a coupling bridge 803 connected to an upper steering shaft 331 and having a first rotary gear 821 and a second rotary gear 823 therein that rotate together with a predetermined gap therebetween; an actuator 807 having both ends respectively coupled to an end and the other end of the coupling bridge 803 and including a wheel body 805 having a space therein and a driving shaft 827 disposed on the coupling bridge 803 and combined with a first driving gear 825 engaged with the first rotary gear 821; a first grip member 809 configured to be inserted into and protruded out of the wheel body 805 at an end of the wheel body 805 by the first driving gear 825; and a second grip member 811 configured to be inserted into and protruded out of the wheel body 805 at the other end of the wheel body 805 by the second rotary gear 823.

First, the coupling bridge 803 is connected to the upper steering shaft 331 and includes the first rotary gear 821 and the second rotary gear 823 therein that rotate together with a predetermined gap therebetween.

The first rotary gear 821 is fitted on a rotary shaft 833 fixed and supported inside the coupling bridge 803 and the second rotary gear 823 is also fitted on a rotary shaft 829 fixed and supported inside the coupling bridge 803.

A first pulley 835 is fitted on the rotary shaft 833, a second pulley 837 is fitted on the rotary shaft 829, and the first pulley 835 and the second pulley 837 are connected to each other by a belt 831.

Accordingly, the first rotary gear 821 and the second rotary gear 823 are rotated together and both ends of the wheel body 805 are respectively coupled to an end and the other end of the coupling bridge 803.

The wheel body 805 has a space therein, and for example, the wheel body 805 may be a rounded pipe having a space therein (i.e., a hollow rounded pipe).

The actuator 807 is disposed on the coupling bridge 803 and includes the driving shaft 827 on which the first driving gear 825 engaged with the first rotary gear 821 is fitted.

The actuator 807 may be an electric motor having the driving shaft 827.

When actuator 801 is operated and the driving shaft 827 is correspondingly rotated, the first driving gear 825 is rotated in the same direction as the rotational direction of the driving shaft 827 and the first rotary gear 821 engaged with the first driving gear 825 is rotated in the opposite direction to the rotational direction of the driving shaft 827.

The first grip member 809 is inserted into and protruded out of the wheel body 805 at an end of the wheel body 805 by the first driving gear 825.

The first grip member 809 is rounded with a curvature corresponding to the curvature of the wheel body 805 to be inserted into and protruded out of the wheel body 805.

Teeth for engaging with the first driving gear 825 are formed on the outer side of a surface (being in contact with the first driving gear 825) of the first grip member 809 so that the first grip member 809 is moved by rotation of the first driving gear 825.

The second grip member 811 is inserted into and protruded out of the wheel body 805 at the other end of the wheel body 805 by the second rotary gear 823.

Similar to the first grip member 809, teeth for engaging with the second rotary gear 823 are formed on the outer side of a surface (being in contact with the second rotary gear 823) of the second grip member 811.

Figure 19:
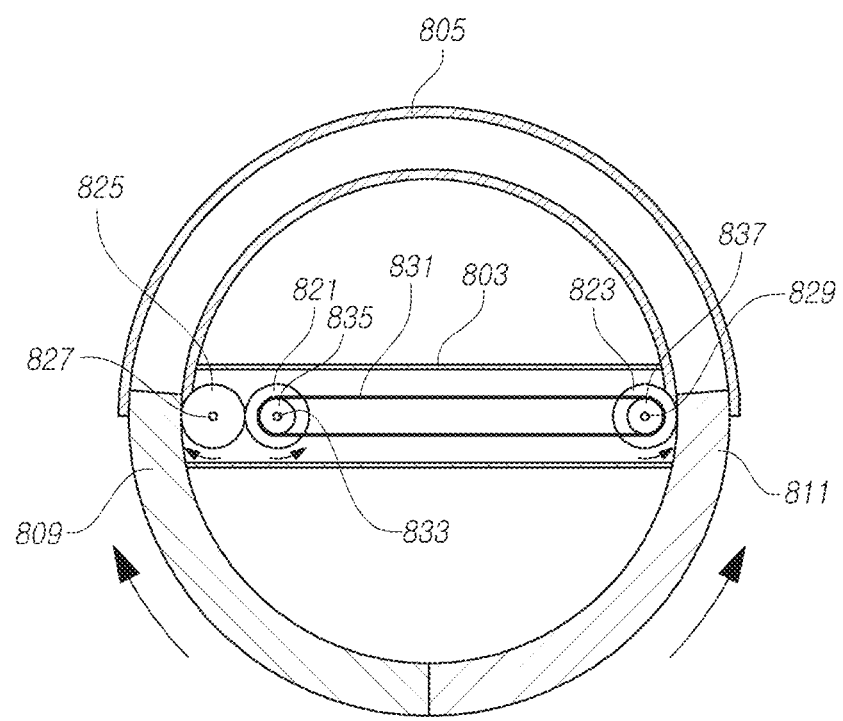
FIGS. 19 and 20 are cross-sectional views of FIG. 17.
Figure 20:
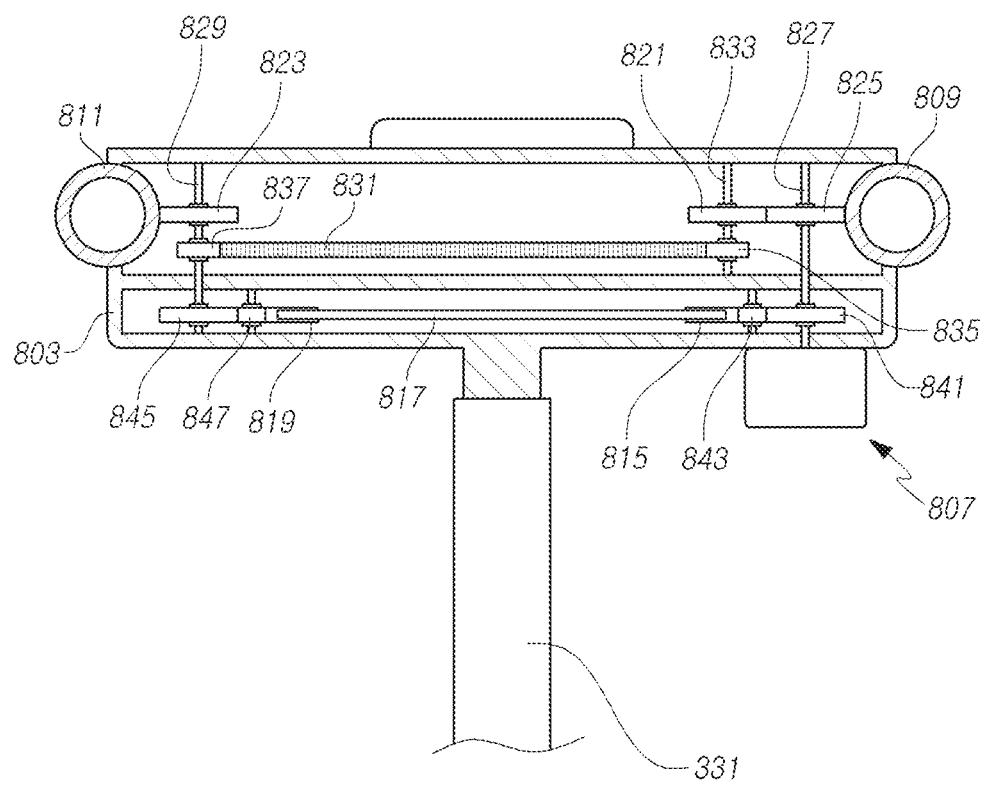
Figure 21:
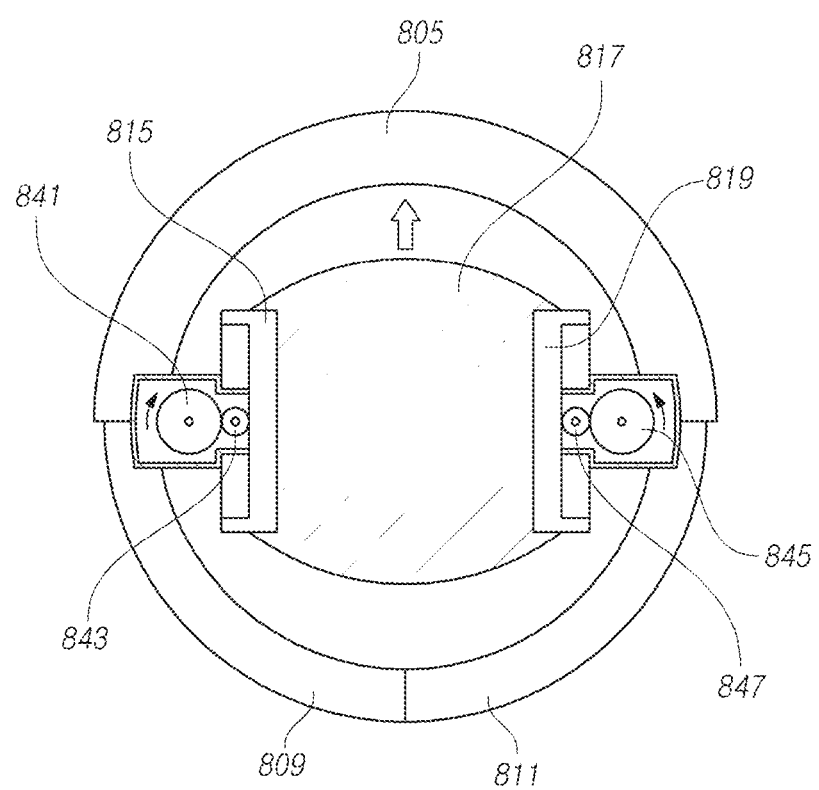
FIG. 21 is a view showing an example of a display module shown in FIG. 17.

According to this configuration, as shown in FIG. 19, when the first driving gear 825 is rotated clockwise, the first grip member 809 is inserted into the wheel body 805, the first rotary gear 821 engaged with the first driving gear 825 is rotated counterclockwise, the second rotary gear 823 connected with the first rotary gear 821 by the belt 831 is also rotated counterclockwise, and the second grip member 811 is inserted into the wheel body 805.

Embodiments of the present disclosure may include a display module 813 disposed behind the coupling bridge 803 and moved up and down by a driving force from the actuator 807.

The display module 813, for example, includes a first guide bracket 815 and a display panel 817.

The first guide bracket 815 is moved up and down by a first driven gear 843 engaged with the second driving gear 841 fitted on the driving shaft 827 and rotatably supported inside the coupling bridge 803.

The first guide bracket 815 has an open side in which a side of the display panel 817 is fitted and fixed, and has teeth on the other side to be engaged with the first driven gear 843.

A side of the display panel 817 is coupled and supported to the first guide bracket 815. The display panel 817, for example, may be an LCD panel or an OLED panel and various items of information of a vehicle can be displayed through the display panel 817.

The display module 813 includes a second guide bracket 819 engaged with a third driving gear 845 fitted on the rotary shaft 829 of the second rotary gear 823, moved up and down by a second driven gear 847 rotatably supported inside the coupling bridge 803, and coupling and supporting the other side of the display panel 817.

The second guide bracket 819 is formed symmetrically to the first guide bracket 815.

Figure 22:
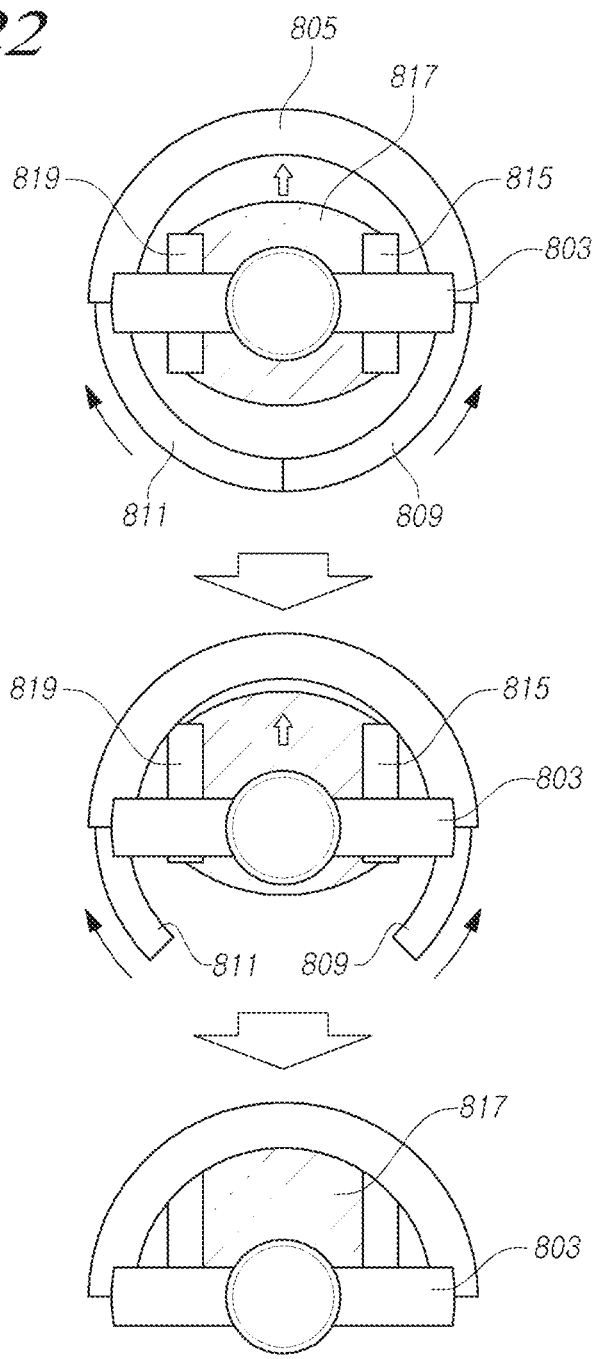
FIG. 22 is a view showing a process of operating a steering wheel according to embodiments of the present disclosure.
Figure 23:
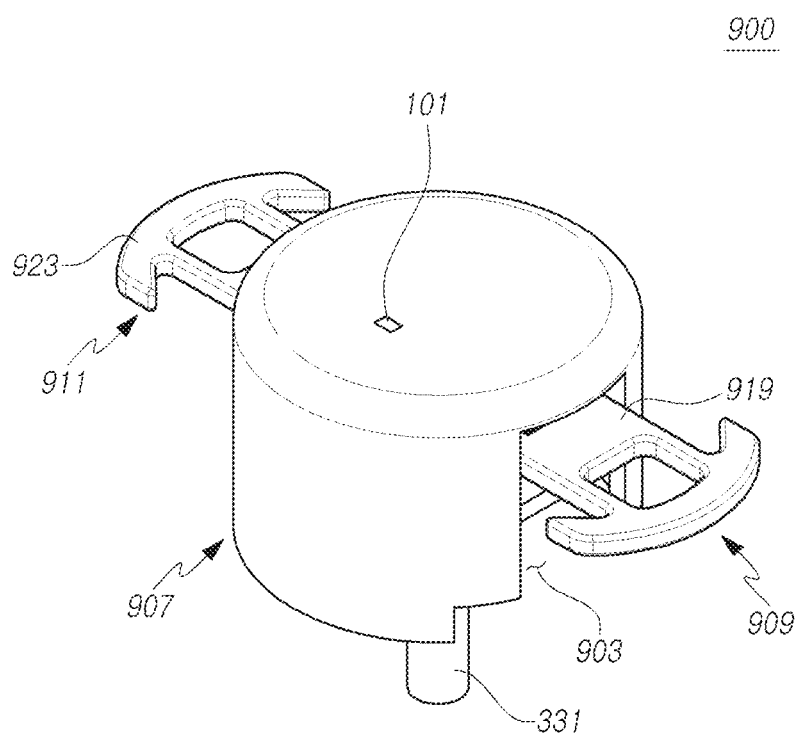
FIGS. 23 and 24 are perspective views showing an example in which grip members are protruded out of a shaft coupler of a steering wheel according to embodiments of the present disclosure.
Figure 24:
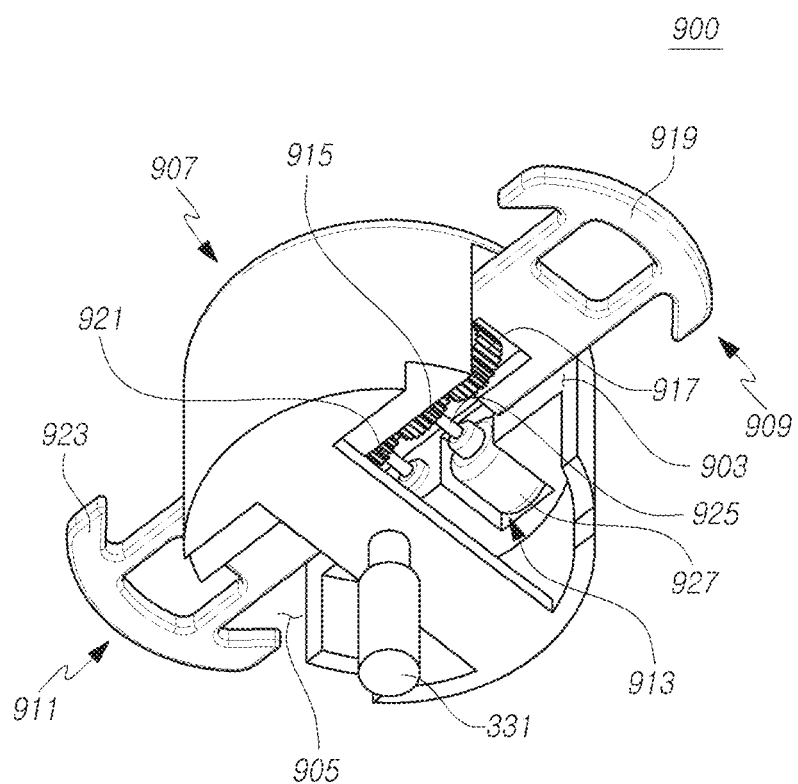
Figure 25:
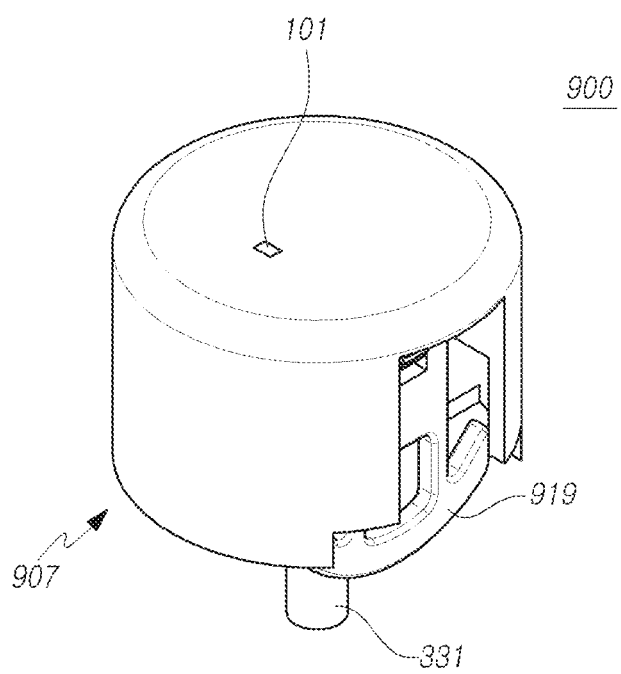
FIGS. 25 and 26 are perspective views showing an example in which grip members are inserted in a shaft coupler of a steering wheel according to embodiments of the present disclosure.
Figure 26:
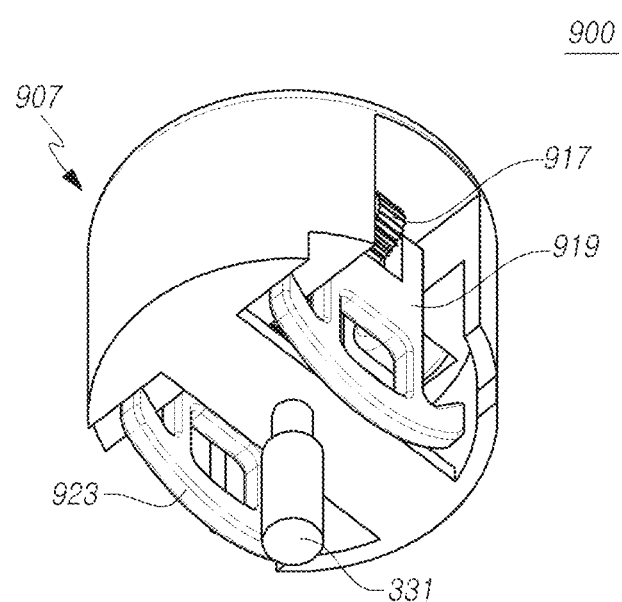

According to this configuration, when the actuator 807 is operated and the first driving gear 825 is rotated clockwise (in FIG. 19), as described above, the first grip member 809 and the second grip member 811 are inserted into the wheel body 805 and the display module 813 is moved up (see FIG. 22).

More detailed description of this process on the basis of the rotational directions of the gears (in FIG. 19) is as follows.

First, the first driving gear 825: rotated clockwise (the first grip member 809 inserted into the wheel body 805)→the first rotary gear 821: rotated counterclockwise→the second rotary gear 823: rotated counterclockwise (the second grip member 811 inserted into the wheel body 805)/the first driving gear 825: rotated clockwise (the first grip member 809 inserted into the wheel body 805)→the second driving gear 841: rotated clockwise→the first driven gear 843: rotated counterclockwise→the first guide bracket 815: moved up.

When the second rotary gear 823 is rotated counterclockwise, the third driving gear 845 sharing the rotary shaft 829 with the second rotary gear 823 is also rotated counterclockwise and the second guide bracket 819 is also moved up by the second driven gear 847.

Accordingly, when the actuator 807 is operated and the first grip member 809 and the second grip member 811 are inserted into the wheel body 805, the display module 813 is also moved up. In contrast, when the actuator 807 is operated and the first grip member 809 and the second grip member 811 are protruded out of the wheel body 805, the display module 813 is also moved down.

Referring to FIGS. 22 to 32, a steering wheel 900 for a vehicle according to embodiments of the present disclosure may include: a shaft coupler 907 connected to an upper steering shaft 331 of a vehicle and having a first opening 903 and a second opening 905 at both sides respectively; a first grip member 909 rotatably supported on a side in the shaft coupler 907 to be inserted into and protruded out of the shaft coupler 907; a second grip member 911 rotatably supported on the other side in the shaft coupler 907 to be inserted into and protruded out of the shaft coupler 907 through the second opening 905; and an actuator 913 disposed in the shaft coupler 907 to provide a rotational driving force to the first grip member 909 and the second grip member 911.

The shaft coupler 907, which is connected to the upper steering shaft 331 of a vehicle, for example, is formed in a substantially hollow cylindrical shape and the upper steering shaft 331 of a vehicle is connected to the bottom of the shaft coupler 907.

The first opening 903 and the second opening 905 are formed on both sides of the shaft coupler 907, respectively.

The first grip member 909 is rotatably supported at a side in the shaft coupler 907 and is inserted into and protruded out of the shaft coupler 907 through the first opening 909.

An example of the configuration of the first grip member 909 is described in more detail. The first grip member 909 includes a first rotary shaft 917a rotatably supported on a side in the shaft coupler 907; a first driven gear 917 fitted on the first rotary shaft 917a and engaged with a driving gear 915 to be described below; and a first grip 919 combined with the first rotary shaft 917a to be inserted into and protruded out of the shaft coupler 907 through the first opening 903, depending on the rotational direction of the first rotary shaft 917a.

The first rotary shaft 917a is rotatably supported on a side in the shaft coupler 907, and though not shown in the drawings, the first rotary shaft 917a can be rotatably supported by a bearing inserted and fixed on an inner side of the shaft coupler 907.

The first driven gear 917 is fitted on the first rotary shaft 917a and is engaged with the driving gear 915 to be described below.

According to this configuration, rotational motion of the driving gear 915 is transmitted to the first driven gear 917, so the first rotary shaft 917a is rotated.

The first grip 919 is combined with the first rotary shaft 917a, so when the first rotary shaft 917a is rotated, the first grip 919 is rotated about the first rotary shaft 917a.

That is, the first grip 919 is inserted into and protruded out of the shaft coupler 907 through the first opening 903, depending on the rotational direction of the first rotary shaft 917a.

The second grip member 911 is rotatably supported on the other side in the shaft coupler 907 and is inserted into and protruded out of the shaft coupler 907 through the second opening 905.

An example of the configuration of the second grip member 911 is described in more detail. The second grip member 911 includes a second rotary shaft 922a rotatably supported on the other side in the shaft coupler 907; a second driven gear 922 fitted on a second rotary shaft 922a and engaged with a connecting gear 921 to be described below; and a second grip 923 combined with the second rotary shaft 922a to be inserted into and protruded out of the shaft coupler 901 through the second opening 905, depending on the rotational direction of the second rotary shaft 922a.

The second rotary shaft 922a is rotatably supported on the other side in the shaft coupler 907, and though not shown in the drawings, the second rotary shaft 922a can be rotatably supported by a bearing inserted and fixed on the other inner side of the shaft coupler 907.

The second driven gear 922 is fitted on the second rotary shaft 922a and is engaged with the connecting gear 921.

The connecting gear 921 is rotatably supported in the shaft coupler 907 and is engaged with the driving gear 915.

That is, the connecting gear 921 connects the driving gear 915 and the second driven gear 922 such that the rotational direction of the second driven gear 922 becomes the same as the rotational direction of the driving gear 915.

The second grip 923 is combined with the second rotary shaft 922a, so when the second rotary shaft 922a is rotated, the second grip 923 is rotated about the second rotary shaft 922a.

That is, the second grip 923 is inserted into and protruded out of the shaft coupler 907 through the second opening 905, depending on the rotational direction of the second rotary shaft 922a.

The actuator 913 is disposed in the shaft coupler 907 and provides a rotational driving force to the first grip member 909 and the second grip member 911.

An example of the actuator 913 is described in more detail. The actuator 913 includes an actuator body 927 coupled and fixed in the shaft coupler 907 and having a driving shaft 925 that is rotated and a driving gear 915 fitted on the driving shaft 925.

The actuator body 927 is coupled and fixed to the inner side of the shaft coupler 907 and may be an electric motor having the driving shaft 925.

The driving gear 915 is fitted on the driving shaft 925 and is engaged with the first driven gear 917 and the connecting gear 921.

Figure 27:
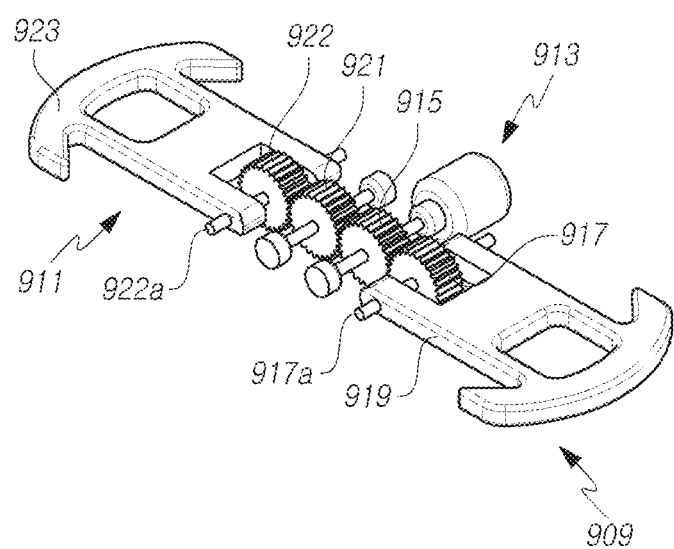
FIGS. 27 and 28 are perspective views showing an operation example of an actuator and the grip members shown in FIG. 23.
Figure 28:
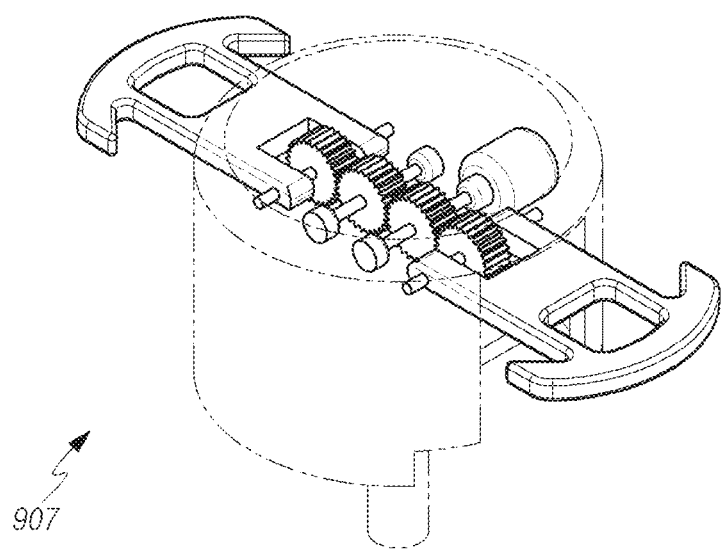

Referring to FIGS. 23 to 27, when the actuator 913 is operated and the driving gear 915 is rotated in a first direction (clockwise in FIG. 27), the first driven gear 917 is rotated in a second direction (counterclockwise in FIG. 27). Accordingly, the first grip 919 is also rotated counterclockwise about the first rotary shaft 917a, whereby the first grip 919 is protruded out of the shaft coupler 907 through the first opening 903 of the shaft coupler 907.

In this process, the connecting gear 921 is rotated counterclockwise and the second driven gear 922 engaged with the connecting gear 921 is rotated clockwise, so the second grip 223 is also rotated clockwise about the second rotary shaft 922a. Accordingly, the second grip 923 is protruded out of the shaft coupler 907 through the second opening 905 of the shaft coupler 907.

That is, when the driving gear 915 is rotated in the first direction (clockwise in FIG. 27), the first grip 919 and the second grip 923 are protruded out of the shaft coupler 907.

This operation makes the operation state of the steering wheel in a driver-driving mode of a vehicle.

Figure 31:
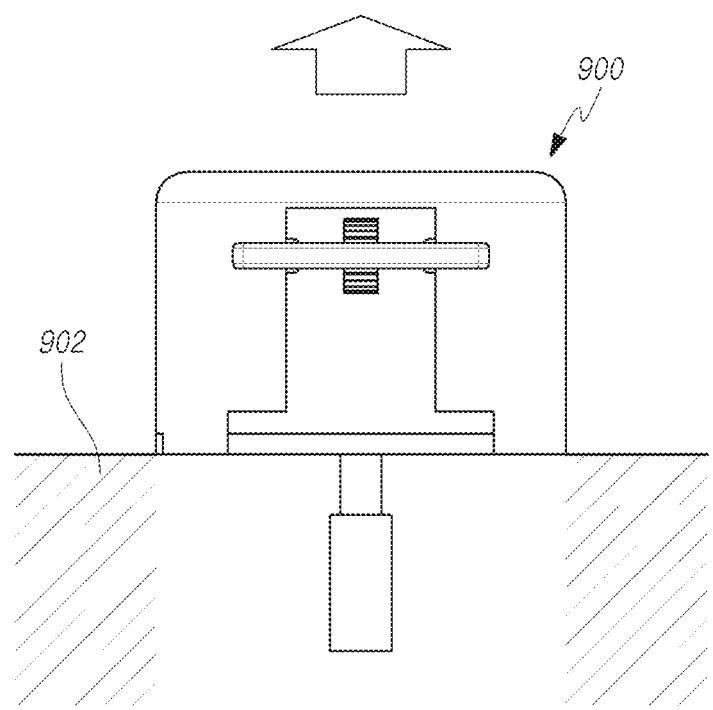
FIG. 31 is a view showing an example in which a steering wheel according to embodiments of the present disclosure protrudes out of a dashboard.

That is, as shown in FIG. 31, in a driver-driving mode of a vehicle, the steering wheel 900 of the vehicle protrudes out of a dashboard 902, so a driver can steer with the first and second grip members 909 and 911 in hands.

Figure 29:
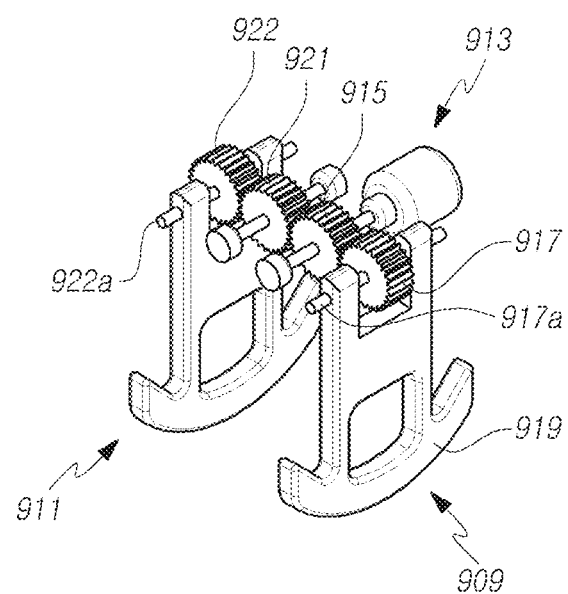
FIGS. 29 and 30 are perspective views showing an operation example of an actuator and the grip members shown in FIG. 25.
Figure 30:
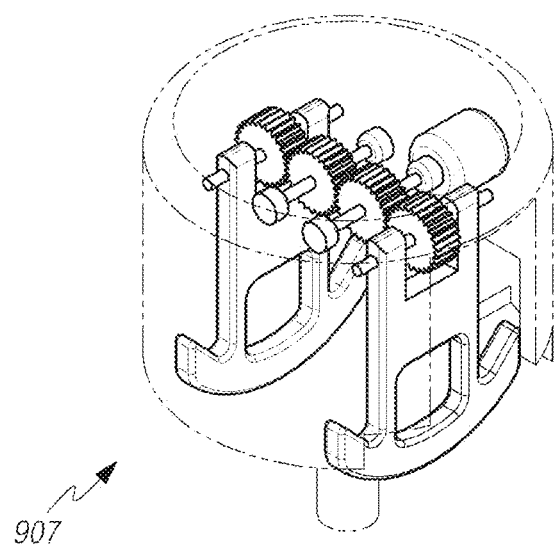

On the contrary, referring to FIGS. 25 to 29, when the actuator 913 is operated and the driving gear 915 is rotated in a second direction (counterclockwise in FIG. 29), the first driven gear 917 is rotated in a first direction (clockwise in FIG. 29). Accordingly, the first grip 919 is also rotated clockwise about the first rotary shaft 917a, whereby the first grip 919 is inserted into the shaft coupler 907 through the first opening 903 of the shaft coupler 907.

In this process, the connecting gear 921 is rotated clockwise and the second driven gear 922 engaged with the connecting gear 921 is rotated counterclockwise, so the second grip 923 is also rotated counterclockwise about the second rotary shaft 922a. Accordingly, the second grip 923 is inserted into the shaft coupler 907 through the second opening 905 of the shaft coupler 907.

That is, when the driving gear 915 is rotated in the second direction (clockwise in FIG. 29), the first grip 919 and the second grip 923 are inserted into the shaft coupler 907.

This operation makes the operation state of the steering wheel in a self-driving mode of a vehicle.

Figure 32:
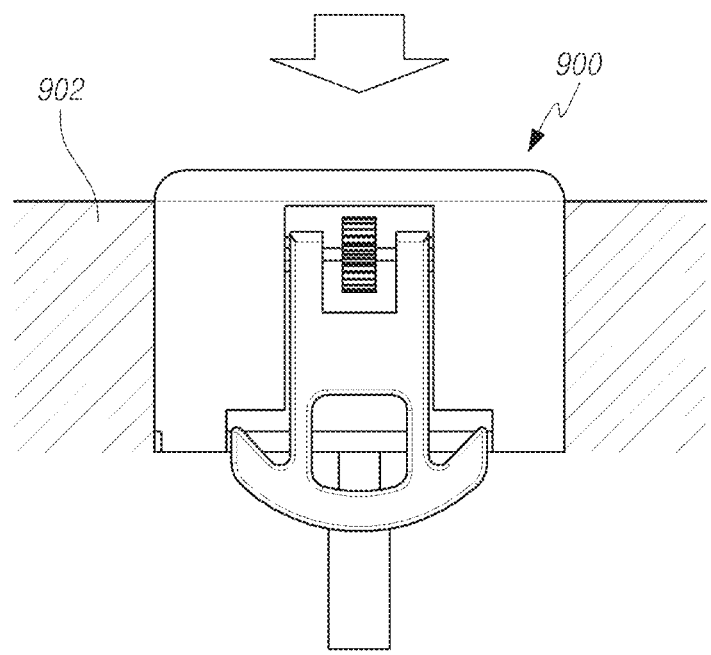
FIG. 32 is a view showing an example in which a steering wheel according to embodiments of the present disclosure is inserted in a dashboard.

That as shown in FIG. 32, in a self-driving mode of a vehicle, the steering wheel 900 of the vehicle is inserted in the dashboard 902, so a driver can more widely use the space around the driver's seat.

According to these embodiments of the present disclosure, in accordance with necessity of a driver, a steering column is protruded out of a dashboard and a steering wheel is moved to a position where it can be operated by the driver or, the steering column is inserted into the dashboard and the steering wheel is moved close to the dashboard. Further, grip members of a steering wheel are protruded out of the steering wheel in a driver-driving mode, so a driver can steer a vehicle with the grip members in hand. In addition, grip members are stowed in a steering wheel in a self-driving mode, so a driver can more widely use the space around the driver's seat.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The above embodiments have been described merely for the purpose of illustrating the technical idea of the present disclosure, and those skilled in the art will appreciate that various modifications and changes are possible without departing from the scope and spirit of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A steering apparatus for a vehicle, comprising:
   a steering wheel comprising a shaft coupler connected to an upper steering shaft of a vehicle, and a first grip member and a second grip member disposed on the shaft coupler;
   a steering column having the upper steering shaft therein and connected with the shaft coupler to change the axial length thereof in accordance with driving modes; and
   a controller configured to rotate at least one of the first grip member, the second grip member, and the shaft coupler, depending on the driving modes,
   wherein at least one of the first grip member and the second grip member is configured to be rotatable relative to each other about the steering column.

2. The steering apparatus of claim 1, wherein the first grip member has a first connection hole at a side and has a first grip at the opposite side, the second grip member has a second connection hole corresponding to the first connection hole and has a second grip at the opposite side.

3. The steering apparatus of claim 2, wherein the shaft coupler couples the first grip member and the second grip member to each other through the first connection hole and the second connection hole.

4. The steering apparatus of claim 1, wherein when the driving mode is a self-driving mode, the controller rotates at least one of the first grip member, the second grip member, and the shaft coupler in a first rotational direction such that the first grip member and the second grip member close with the shaft coupler therebetween, and
   when the driving mode is a driver-driving mode, the controller rotates at least one of the first grip member, the second grip member, and the shaft coupler in a second rotational direction such that the first grip member and the second grip member spread.

5. The steering apparatus of claim 1, wherein the steering column comprises:
   a rack gear axially disposed on a portion of the outer side of the upper steering shaft; and
   an outer column having a gear coupling hole corresponding to the position of the rack gear and being open to be engaged with a pinion gear.

6. The steering apparatus of claim 1, wherein the steering wheel comprises: a first rotary gear and a second rotary gear disposed in the shaft coupler with a predetermined gap therebetween and rotating together;
   a wheel body having both ends respectively coupled to an end and the other end of the shaft coupler and having a space therein; and
   an actuator disposed on the shaft coupler and comprising a driving shaft combined with the first driving gear engaged with the first rotary gear, and
   the first grip member is inserted into and protruded out of the wheel body at an end of the wheel body by the first driving gear, and the second grip member is inserted into and protruded out of the wheel body at the other end of the wheel body by the second rotary gear.

7. The steering apparatus of claim 6, further comprising a display module disposed behind the coupling bridge and moved up and down by a driving force from the actuator.

8. The steering apparatus of claim 7, wherein the display module comprises:
   a first guide bracket moved up and down by a first driven gear engaged with the second driving gear fitted on the driving shaft, and rotatably supported inside the shaft coupler; and
   a display panel having a side coupled and supported to the first guide bracket.

9. The steering apparatus of claim 8, wherein the display module comprises a second guide bracket engaged with a third driving gear fitted on a rotary shaft of the second rotary gear; moved up and down by a second driven gear rotatably supported inside the shaft coupler; and coupling and supporting the other side of the display panel.

10. The steering apparatus of claim 6, wherein the first rotary gear and the second rotary gear are connected to each other by a belt.

11. The steering apparatus of claim 1, wherein the steering wheel comprises:
    a first opening and a second opening formed respectively at both sides of the shaft coupler; and
    an actuator disposed inside the shaft coupler and providing a rotational driving force to the first grip member and the second grip member, and
    the first grip member is rotatably supported on a side in the shaft coupler to be inserted into and protruded out of the shaft coupler through the first opening and the second grip member is rotatably supported on the other side in the shaft coupler to be inserted into and protruded out of the shaft coupler through the second opening.

12. A steering apparatus for a vehicle, comprising:
a steering wheel comprising a shaft coupler connected to an upper steering shaft of a vehicle, and a first grip member and a second grip member disposed on the shaft coupler;
a steering column having the upper steering shaft therein and connected with the shaft coupler to change the axial length thereof in accordance with driving modes;
a controller configured to rotate at least one of the first grip member, the second grip member, and the shaft coupler, depending on the driving modes;
an inner cover shaft having an end coupled to an end of the upper steering shaft;
an inner housing coupled to an end of the inner cover shaft and having a guide protrusion on the outer side thereof;
a control housing having a guide hole axially formed to receive the guide protrusion; and
a cover housing in which the control housing is rotatably inserted and that is fixed to a car body of the vehicle.

13. The steering apparatus of claim 12, wherein a driving motor that rotates the control housing is combined with the cover housing, a first gear is formed at the other end of the control housing, and a second gear rotating the first gear is disposed on a shaft of the driving motor.

14. The steering apparatus of claim 12, wherein a connection hole axially connected with the guide hole is formed at an end of the control housing.

15. The steering apparatus of claim 12, wherein any one of a fixing protrusion and a fixing groove is formed at an end of the inner cover shaft and the other one of the fixing protrusion and the fixing groove is formed at an end of the upper steering shaft.

16. The steering apparatus of claim 12, further comprising an outer cover shaft having an end in which the inner cover shaft is coupled and the other end on which the inner housing is coupled such that the inner cover shaft and the inner housing axially slide.

17. A steering apparatus for a vehicle, comprising:
a steering wheel comprising a shaft coupler connected to an upper steering shaft of a vehicle, and a first grip member and a second grip member disposed on the shaft coupler;
a steering column having the upper steering shaft therein and connected with the shaft coupler to change the axial length thereof in accordance with driving modes; and
a controller configured to rotate at least one of the first grip member, the second grip member, and the shaft coupler, depending on the driving modes,
wherein the steering wheel comprises:
a first opening and a second opening formed respectively at both sides of the shaft coupler; and
an actuator disposed inside the shaft coupler and providing a rotational driving force to the first grip member and the second grip member,
wherein the first grip member is rotatably supported on a side in the shaft coupler to be inserted into and protruded out of the shaft coupler through the first opening and the second grip member is rotatably supported on the other side in the shaft coupler to be inserted into and protruded out of the shaft coupler through the second opening, and
wherein the actuator comprises:
an actuator body coupled and fixed in the shaft coupler and having a driving shaft that is rotated; and
a driving gear fitted on the driving shaft.

18. The steering apparatus of claim 17, wherein the first grip member comprises:
a first rotary shaft rotatably supported on a side in the shaft coupler;
a first driven gear fitted on the first rotary shaft and engaged with the driving gear; and
a first grip combined with the first rotary shaft to be inserted into and protruded out of the shaft coupler through the first opening, depending on the rotational direction of the first rotary shaft.

19. The steering apparatus of claim 17, further comprising a connecting gear rotatably supported in the shaft coupler and engaged with the driving gear.

20. The steering apparatus of claim 19, wherein the second grip member comprises:
a second rotary shaft rotatably supported on the other side in the shaft coupler;
a second driven gear fitted on the second rotary shaft and engaged with the connecting gear; and
a second grip combined with the second rotary shaft to be inserted into and protruded out of the shaft coupler through the second opening, depending on the rotational direction of the second rotary shaft.

* * * * *